US012741845B2

(12) United States Patent
Nakagawa et al.

(10) Patent No.: US 12,741,845 B2
(45) Date of Patent: Sep. 22, 2026

(54) WIRELESS POWER SUPPLY SYSTEM

(71) Applicant: Mitsubishi Electric Corporation, Tokyo (JP)

(72) Inventors: Mariko Nakagawa, Tokyo (JP); Tomokazu Sakashita, Tokyo (JP); Takuya Miura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 904 days.

(21) Appl. No.: 18/017,083

(22) PCT Filed: Sep. 4, 2020

(86) PCT No.: PCT/JP2020/033648
§ 371 (c)(1),
(2) Date: Jan. 20, 2023

(87) PCT Pub. No.: WO2022/049736
PCT Pub. Date: Mar. 10, 2022

(65) Prior Publication Data
US 2023/0294957 A1 Sep. 21, 2023

(51) Int. Cl.
*H02J 7/00* (2026.01)
*B66B 1/06* (2006.01)
(Continued)

(52) U.S. Cl.
CPC ............ *B66B 1/06* (2013.01); *B66B 11/0226* (2013.01); *H02J 7/865* (2026.01); *H02J 50/10* (2016.02); *H02J 50/40* (2016.02)

(58) Field of Classification Search
None
See application file for complete search history.

(56) References Cited

U.S. PATENT DOCUMENTS

| | | | | |
|---|---|---|---|---|
| 2012/0217818 | A1* | 8/2012 | Yerazunis ................ | H04B 5/26 307/104 |
| 2015/0314984 | A1 | 11/2015 | McCarthy et al. | |
| 2019/0036370 | A1* | 1/2019 | Kanno .................... | H02J 50/12 |

FOREIGN PATENT DOCUMENTS

| | | |
|---|---|---|
| CN | 102556786 A | 7/2012 |
| CN | 105048650 A | 11/2015 |

(Continued)

OTHER PUBLICATIONS

International Search Report and Written Opinion mailed on Oct. 6, 2020, received for PCT Application PCT/JP2020/033648, filed on Sep. 4, 2020, 10 pages including English Translation.

(Continued)

*Primary Examiner* — Arun C Williams
(74) *Attorney, Agent, or Firm* — XSENSUS LLP

(57) ABSTRACT

A power transmission unit includes a plurality of power transmission coils provided along a hoistway and at least one power transmission device that supplies power to each of a plurality of power transmission coils. A power reception unit includes a plurality of power reception coils provided on a surface of a car opposite to the power transmission coil and at least one power reception device that receives the power from each of power reception coils. The plurality of power transmission coils include at least a first power transmission coil and a second power transmission coil. A length of the second power transmission coil in a traveling direction of the car is longer than a length of the first power transmission coil.

12 Claims, 28 Drawing Sheets

(51) Int. Cl.

| | |
|---|---|
| ***B66B 11/02*** | (2006.01) |
| ***H02J 50/10*** | (2016.01) |
| ***H02J 50/40*** | (2016.01) |

(56) References Cited

FOREIGN PATENT DOCUMENTS

| | | | |
|---|---|---|---|
| JP | 2006-8394 | A | 1/2006 |
| JP | 2012-121708 | A | 6/2012 |
| JP | 2017-51074 | A | 3/2017 |
| JP | 2017-169277 | A | 9/2017 |
| JP | 6687173 | B1 | 4/2020 |

OTHER PUBLICATIONS

Office Action issued Jun. 27, 2025 in Chinese Patent Application No. 202080103419.3, 14 pages.

* cited by examiner

MAIN POWER SUPPLY
3
CONTROLLER
16
SECOND POWER TRANSMISSION UNIT
SECOND POWER TRANSMISSION COIL
POWER TRANSMISSION DEVICE
5
14
12
FIRST POWER TRANSMISSION UNIT
FIRST POWER TRANSMISSION COIL
POWER TRANSMISSION DEVICE
4
13
12
POWER RECEPTION UNIT
POWER RECEPTION DEVICE
POWER RECEPTION COIL
15
7
17
CHARGING CIRCUIT
8
POWER STORAGE PORTION
9
MEASUREMENT PORTION
10
LOAD DEVICE
11

LOAD DEVICE
11
POWER STORAGE PORTION
9
MEASUREMENT PORTION
10
CHARGING CIRCUIT
8
POWER RECEPTION UNIT
POWER RECEPTION DEVICE
POWER RECEPTION COIL
7
15
17
SECOND POWER TRANSMISSION COIL
FIRST POWER TRANSMISSION COIL
POWER TRANSMISSION DEVICE
THIRD POWER TRANSMISSION UNIT
FIRST POWER TRANSMISSION UNIT
51
14
13
4
12
61
62
CONTROLLER
16
MAIN POWER SUPPLY
1

FIG.15

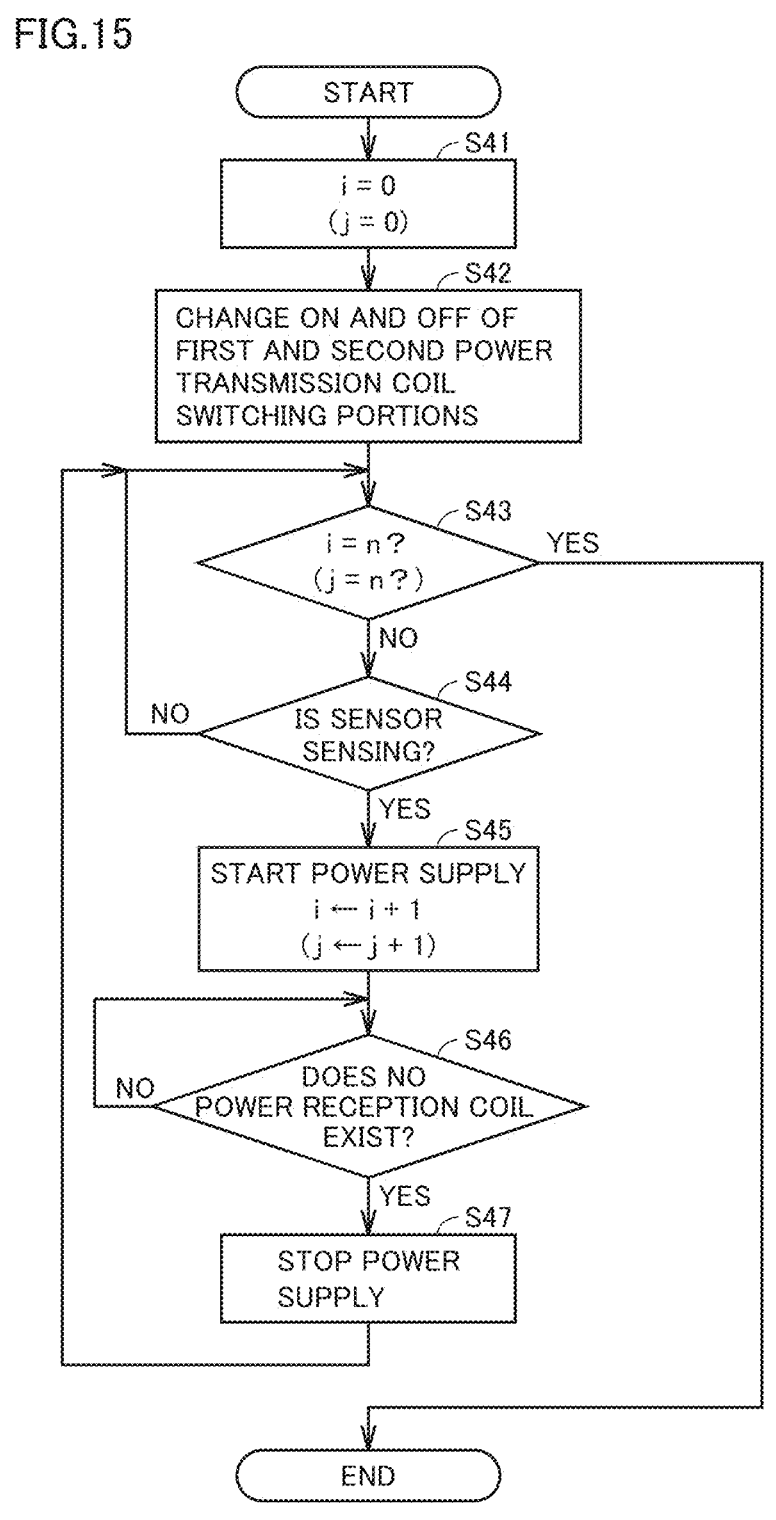

START
S41
i = 0
(j = 0)
S42
CHANGE ON AND OFF OF FIRST AND SECOND POWER TRANSMISSION COIL SWITCHING PORTIONS
S43
i = n ?
(j = n ?)
YES
NO
S44
IS SENSOR SENSING?
NO
YES
S45
START POWER SUPPLY
i ← i + 1
(j ← j + 1)
S46
DOES NO POWER RECEPTION COIL EXIST?
NO
YES
S47
STOP POWER SUPPLY
END

MAIN POWER SUPPLY
CONTROLLER
LOAD DEVICE
POWER STORAGE PORTION
CHARGING CIRCUIT
MEASUREMENT PORTION
POWER RECEPTION UNIT
POWER RECEPTION DEVICE
POWER RECEPTION COIL
POWER TRANSMISSION DEVICE
FIRST POWER TRANSMISSION COIL
SECOND POWER TRANSMISSION COIL
MAIN POWER SUPPLY 1
FOURTH POWER TRANSMISSION UNIT
FIFTH POWER TRANSMISSION UNIT
1
7
8
9
10
11
12
13
14
15
16
17
42
52
63
64
65
66

Figure 28:
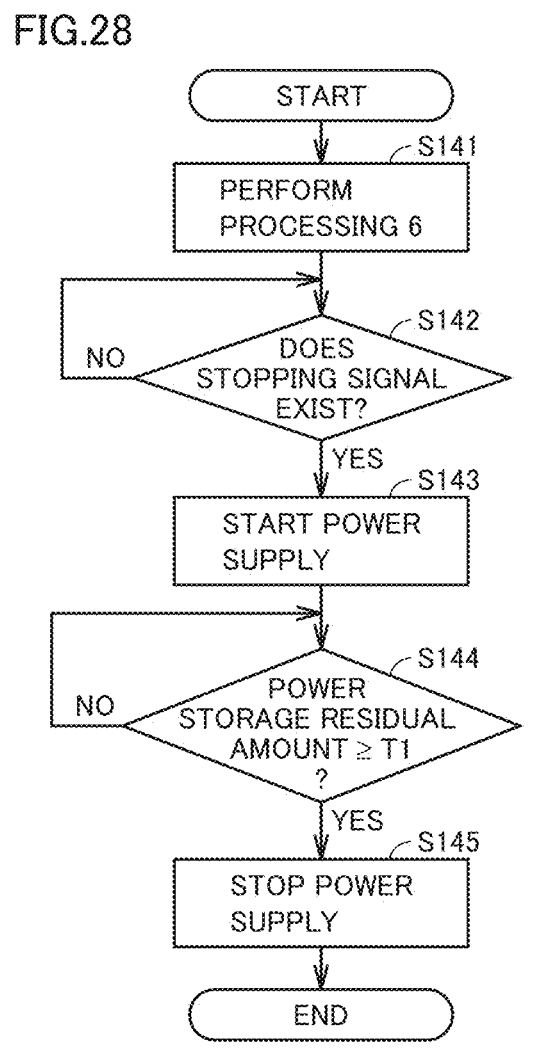

START
S141
PERFORM PROCESSING 6
S142
DOES STOPPING SIGNAL EXIST?
NO
YES
S143
START POWER SUPPLY
S144
POWER STORAGE RESIDUAL AMOUNT ≥ T1 ?
NO
YES
S145
STOP POWER SUPPLY
END

WIRELESS POWER SUPPLY SYSTEM

CROSS-REFERENCE TO RELATED APPLICATION

The present application is based on PCT filing PCT/JP2020/033648, filed Sep. 4, 2020, the entire contents of which are incorporated herein by reference.

TECHNICAL FIELD

The present disclosure relates to a wireless power supply system.

BACKGROUND ART

In general, an elevator supplies power to a load provided in a car through a control cable. Because the control cable becomes heavier and difficult to install as speed becomes higher or a lifting height increases, introduction of a wireless power supply technology that does not use the control cable has been studied. As an introduction of such a technology, for example, PTL 1 discloses a wireless power transmission device that stores power supplied in a contactless manner in a storage battery provided in a car and covers power consumption of a load device provided in the car with the stored power. The wireless power transmission device of PTL 1 enables safe and simultaneous contactless power transmission from a plurality of power transmission coils and a plurality of power reception coils by adjusting the number of power transmission devices to be driven according to a coupling coefficient between the power transmission coil and the power reception coil and the required power of the load device.

CITATION LIST

Patent Literature

PTL 1: Japanese Patent Laying-Open No. 2017-169277

SUMMARY OF INVENTION

Technical Problem

However, the wireless power supply system such as the wireless power transmission device disclosed in PTL 1 performs the power supply in the contactless manner only when the power reception coil established in a moving body stops at a position opposite to the power transmission coil. Therefore, when this system is applied to an elevator, there is a problem that it takes a long stop time to secure a power supply time, thereby decreasing operation efficiency of the elevator.

The present disclosure has been made to solve such a problem, and an object of the present disclosure is to provide a wireless power supply system capable of securing the required power supply time while preventing the decrease in operation efficiency of the elevator.

Solution to Problem

In one aspect of the present disclosure, a wireless power supply system supplies power, in a contactless manner, to a car moving on a hoistway of an elevator. The wireless power supply system includes a power transmission unit, a power reception unit, a controller, and a power storage. The power transmission unit is provided on a hoistway side and supplies the power in the contactless manner. The power reception unit is provided on a car side and receives the power, in the contactless manner, supplied from the power transmission unit. The controller controls the power transmission unit and the power reception unit. The power storage stores the power received by the power reception unit and supplies the power to a load device provided in the car. The power transmission unit includes a plurality of power transmission coils provided along the hoistway and at least one power transmission device that supplies the power to each of the plurality of power transmission coils. The power reception unit includes a plurality of power reception coils provided on a surface of the car opposite to the power transmission coil and at least one power reception device that receives the power from each of the power reception coils. The plurality of power transmission coils include at least a first power transmission coil and a second power transmission coil. A length of the second power transmission coil in a traveling direction of the car is longer than a length of the first power transmission coil.

Advantageous Effects of Invention

According to the present disclosure, the length of the second power transmission coil is longer than the length of the first power transmission coil in the traveling direction of the car, so that the required power supply time can be secured while the decrease in operation efficiency of the elevator is prevented by supplying the power from the second power transmission coil even while the car is moving.

BRIEF DESCRIPTION OF DRAWINGS

FIG. 5 is a view illustrating an example in which the wireless power supply system is established on the stopping floor.

FIG. 6 is a flowchart illustrating mode setting processing executed by a control panel.

FIG. 7 is a flowchart illustrating currently-moving power supply processing executed by a controller.

FIG. 9 is a view illustrating an example in which the wireless power supply system is established on the stopping floor.

FIG. 15 is a flowchart illustrating a currently-moving power supply processing executed by a controller.

FIG. 27 is a flowchart illustrating the currently-stopping power supply processing for the first car executed by the controller.

FIG. 28 is a flowchart illustrating the currently-stopping power supply processing for the second car executed by the controller.

DESCRIPTION OF EMBODIMENTS

Figure 1:
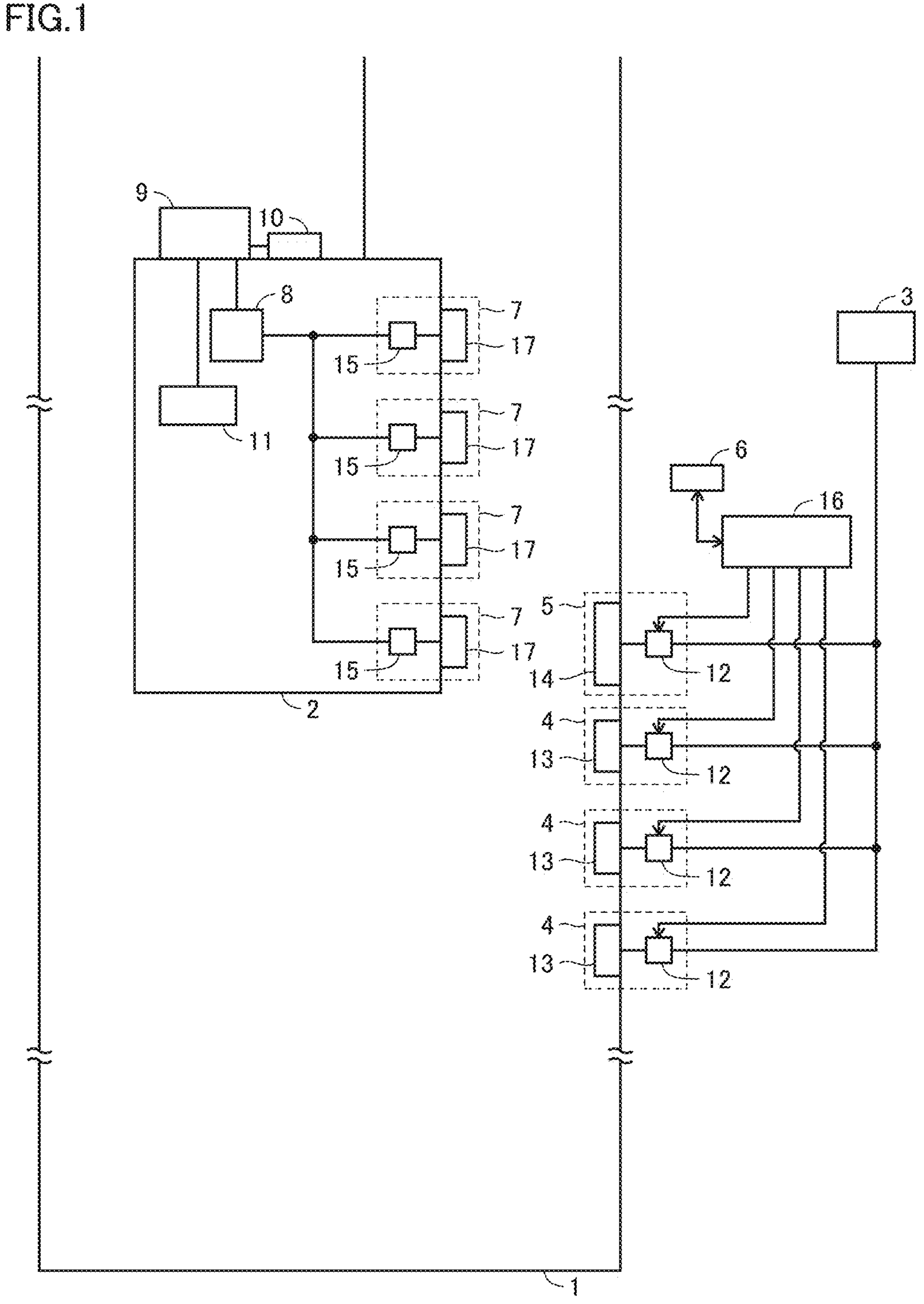
FIG. 1 is a configuration diagram illustrating a wireless power supply system according to a first embodiment.

With reference to the drawings, embodiments of the present disclosure will be described in detail below. In the drawings, the same or corresponding portion is denoted by the same reference numeral, and the description will not be repeated in principle.

First Embodiment

Figure 2:
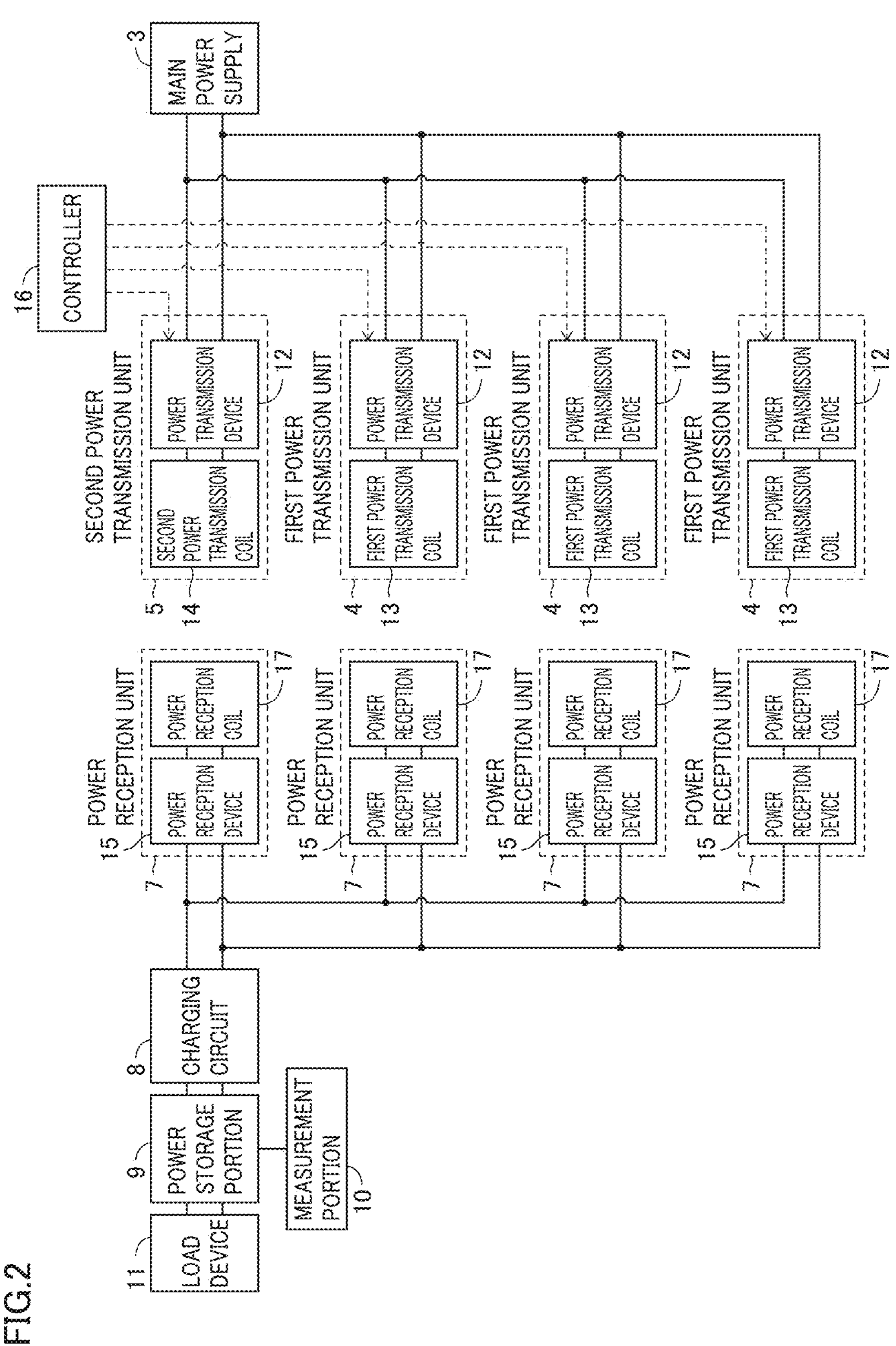
FIG. 2 is a circuit block diagram of the wireless power supply system.

FIG. 1 is a configuration diagram illustrating a wireless power supply system according to a first embodiment. FIG. 2 is a circuit block diagram of the wireless power supply system. In FIGS. 1 and 2, the same reference numerals are given to the same components.

An elevator system of the first embodiment includes a hoistway 1, a car 2 that moves in hoistway 1, and the wireless power supply system used in an elevator. The wireless power supply system is a system that uses a power transmission unit provided on a side of hoistway 1 and a power reception unit provided on a side of car 2 to supply power, in a contactless manner, to car 2 moving in hoistway 1 of the elevator.

The elevator system includes a control panel 6. Control panel 6 controls operation of the entire elevator system. For example, control panel 6 is established in a machine room provided on a rooftop of a building. The present invention is not limited thereto, and control panel 6 may be established on a wall surface of hoistway 1.

As illustrated in FIGS. 1 and 2, the wireless power supply system includes a main power supply 3, a controller 16, a power transmission unit, a power reception unit, a charging circuit 8, a power storage portion 9, a measurement portion 10, and a load device 11.

Main power supply 3 is connected to the power transmission unit to supply power to the power transmission unit. A controller 16 controls the power transmission unit and the power reception unit.

The power transmission unit is provided on the side of hoistway 1 to supply the power in the contactless manner. The power reception unit is provided on the side of car 2 to receive the power, in the contactless manner, supplied from the power transmission unit.

The power transmission unit includes a plurality of power transmission coils provided along hoistway 1 and at least one power transmission device 12 that supplies the power to each of the plurality of power transmission coils. The power transmission coil includes a first power transmission coil 13 and a second power transmission coil 14.

The power reception unit includes a plurality of power reception coils 17 provided on a surface of car 2 opposite to the power transmission coils (first power transmission coil 13, second power transmission coil 14) and at least one power reception device 15 that receives the power from each of power reception coils 17.

At this point, the "power transmission unit" collectively refers to all of power transmission devices 12 and the power transmission coils that are established in hoistway 1. In the first embodiment, among the power transmission units, one constituted by one power transmission device 12 and one first power transmission coil 13 is referred to as a "first power transmission unit 4", and one constituted by power transmission device 12 and second power transmission coil 14 is referred to as a "second power transmission unit 5".

Main power supply 3 is connected to the plurality of power transmission devices 12 to supply the power to these power transmission devices 12. At this point, the "power reception unit" collectively refers to all of power reception devices 15 and power reception coils 17 that are established in car 2. In the first embodiment, among the power reception units, one configured by one power reception device 15 and one power reception coil 17 is referred to as a "power reception unit 7".

Power storage portion 9 supplies the power to load device 11 provided in car 2 while storing the power received by the power reception unit. Specifically, the power is stored in power storage portion 9 through charging circuit 8 connected to the plurality of power reception device 15. The power stored in power storage portion 9 is supplied to load device 11. Measurement portion 10 measures a consumption amount of power storage portion 9.

Here, the power transmission coil (first power transmission coil 13, second power transmission coil 14) connected to power transmission device 12 is established at a stopping floor of car 2. That is, first power transmission unit 4 and second power transmission unit 5 capable of supplying the power to power reception unit 7 established in car 2 are established on the stopping floor of car 2. Hereinafter, the floor, where the power transmission coil is established and the power can be supplied to car 2, is referred to as a "power supply floor". The number of power supply floors may be one or more in the elevator system.

Control panel 6 and controller 16 can communicate with each other in a wireless or wired manner. Controller 16 is established for each power supply floor. On the other hand, as described above, control panel 6 is established in the machine room on the rooftop of the building, and the elevator system includes one control panel 6. Controller 16 established at each power supply floor is connected to and controls the plurality of power transmission devices 12 established at the power supply floor. The elevator system may include a plurality of control panels 6.

In the first embodiment, the plurality of power transmission coils includes at least first power transmission coil 13 and second power transmission coil 14. In the examples of FIGS. 1 and 2, one second power transmission coil 14 and three first power transmission coils 13 are provided in the power supply floor.

At this point, a length of second power transmission coil 14 in a traveling direction (moving direction) of car 2 is longer than a length of first power transmission coil 13. That is, second power transmission coil 14 has a shape longer than first power transmission coil 13 in the moving direction of car 2, and the plurality of power transmission coils are arranged in one row in the moving direction of car 2. Power reception unit 7 is disposed so as to be opposite to power transmission units 4, 5 established in the power supply floor (stopping floor).

As described above, because the length of second power transmission coil 14 is configured to be longer than the length of first power transmission coil 13 in the traveling direction of car 2, the power is supplied from second power transmission coil 13 even while car 2 is moving, so that a required power supply time can be secured while a decrease in operation efficiency of the elevator is prevented.

Figure 3:
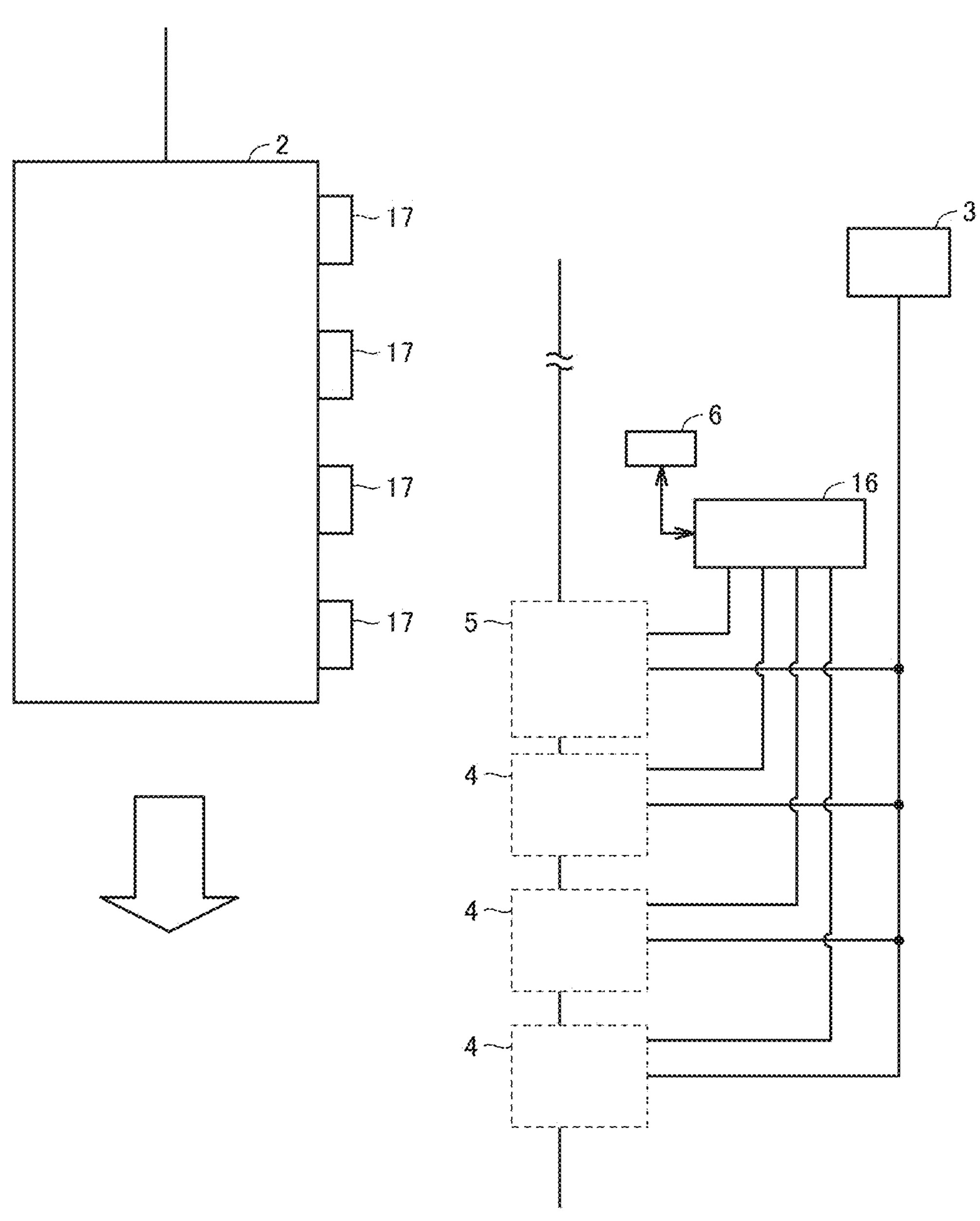
FIG. 3 is a view illustrating an example in which the wireless power supply system is established on a stopping floor.
Figure 4:
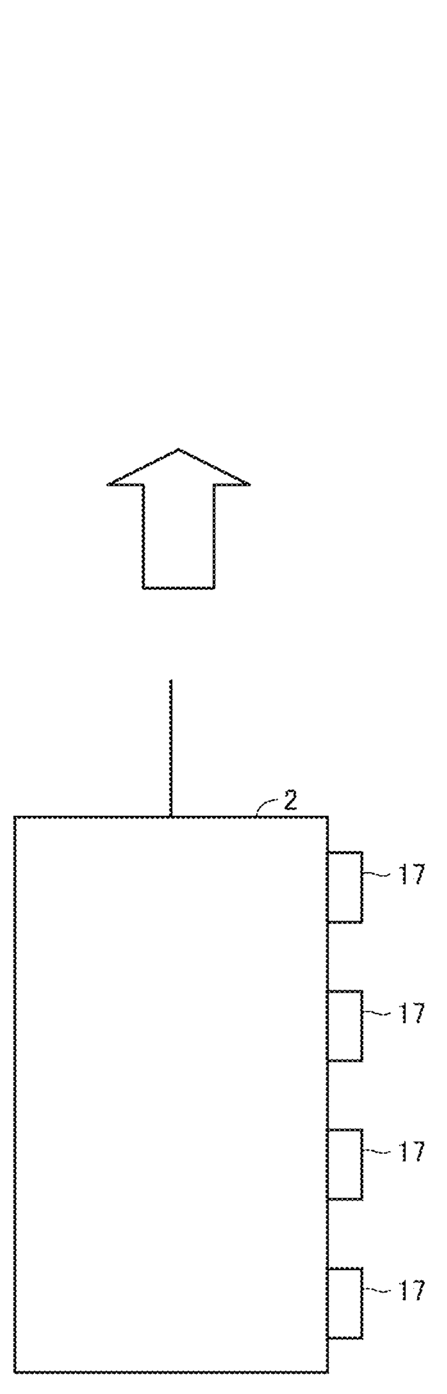
FIG. 4 is a view illustrating an example in which the wireless power supply system is established on the stopping floor.
Figure 4:
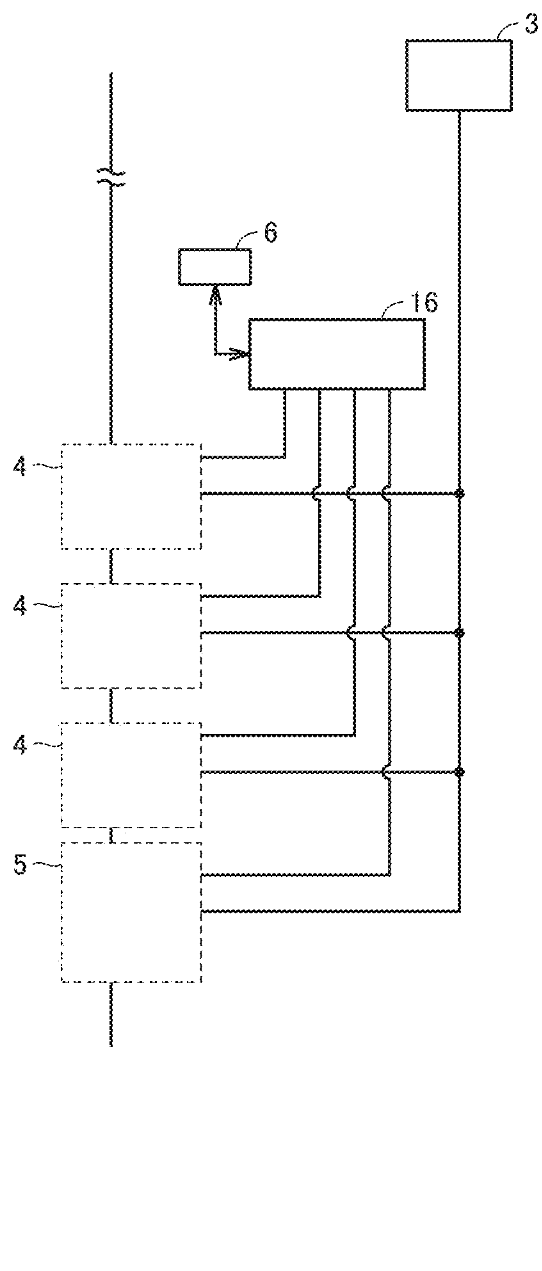
Figure 5:
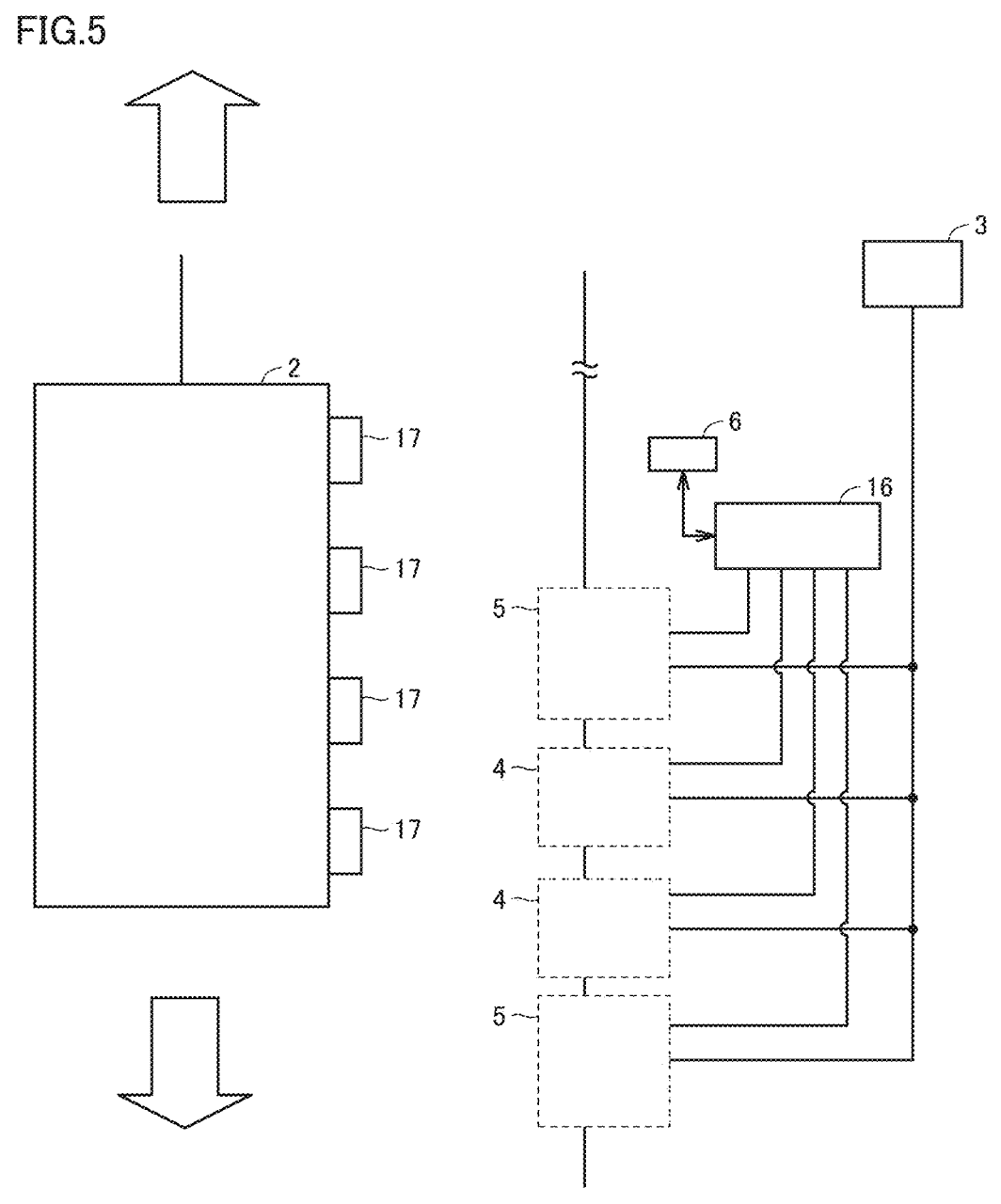

FIGS. 3 to 5 are views illustrating examples in which the wireless power supply system is established on the stopping floor. FIG. 3 illustrates the example in which first power transmission unit 4 and second power transmission unit 5 are established on a lowermost floor, FIG. 4 illustrates the example in which first power transmission unit 4 and second power transmission unit 5 are established on an uppermost floor, and FIG. 5 illustrates an example in which first power transmission unit 4 and second power transmission unit 5 are established on a middle floor, namely, the floor other than the lowermost floor and the uppermost floor.

The examples of FIGS. 3 to 5 are configured as follows. Second power transmission coil 14 is provided on the side closer to the direction in which car 2 enters the power supply floor than first power transmission coil 13 is. When car 2 enters the power supply floor, power reception coil 17 is first opposite to second power transmission coil 14 of car 2, and then is opposite to first power transmission coil 13.

In this way, the number of power reception coils 17 opposite to second power transmission coil 14 becomes the largest, so that the required power supply time can be secured while the decrease in operation efficiency of the elevator is prevented.

Furthermore, when causing power storage portion 9 to store the power while car 2 is moving on the power supply floor (hereinafter, also referred to as "currently-moving power supply"), controller 16 causes power transmission device 12 to supply the power to second power transmission coil 14. When causing power storage portion 9 to store the power while car 2 is stopped on the power supply floor (hereinafter, also referred to as "currently-stopping power supply), controller 16 causes power transmission device 12 to supply the power to first power transmission coil 13.

In addition, a coupling degree when first power transmission coil 13 is opposite to power reception coil 17 is larger than a coupling degree when second power transmission coil 14 is opposite to power reception coil 17.

In the first embodiment, first power transmission coil 13 and power reception coil 17 are designed and established such that the coupling degree is high during the currently-stopping power supply in which first power transmission coil 13 and power reception coil 17 are opposite to each other. On the other hand, since second power transmission coil 14 has a shape longer than first power transmission coil 13 in the traveling direction of car 2, the coupling degree with power reception coil 17 designed to increase the coupling degree with first power transmission coil 13 decreases.

In addition, in order to secure a long time during which second power transmission coil 14 and power reception coil 17 are opposite to each other while car 2 moves, it is conceivable to establish second power transmission coil 14 such that a center of power reception coil 17 is not matched with a center of second power transmission coil 14 when car 2 stops at the power supply floor. For this reason, when car 2 stops at the power supply floor, the coupling degree between second power transmission coil 14 and power reception coil 17 is lower than the coupling degree between first power transmission coil 13 and power reception coil 17.

As described above, in the currently-moving power supply, the longer power supply time can be secured using second power transmission coil 14. On the other hand, in the currently-stopping power supply, the power supply can be performed while the high efficiency is maintained using first power transmission coil 13.

With reference to FIGS. 3 to 5, details will be described below. As illustrated in FIG. 3, one second power transmission unit 5 and at least one first power transmission unit 4 are established on the lowermost floor. Second power transmission coil 14 is established in the upper portion of the hoistway of first power transmission coil 13, namely, at the position first opposite to power reception coil 17 established in car 2 that moves to the lowermost floor. That is, second power transmission coil 14 is provided on the side closer to the direction in which car 2 enters the power supply floor.

As illustrated in FIG. 4, in the uppermost floor, one second power transmission unit 5 and at least one first power transmission unit 4 are established similarly to FIG. 3. Second power transmission coil 14 is established below first power transmission coil 13 on the hoistway, namely, at the position first opposite to power reception coil 17 established in car 2 that moves to the uppermost floor. That is, second power transmission coil 14 is provided on the side closer to the direction in which car 2 enters the power supply floor.

As illustrated in FIG. 5, at least one second power transmission unit 5 and at least one first power transmission unit 4 are established on the middle floor. Second power transmission coil 14 is established in two moving directions first opposite to power reception coil 17 established in car 2 that moves to an upper portion and a lower portion of the hoistway than first power transmission coil 13, namely, the middle floor, namely, established at the position first opposite to power reception coil 17 established in car 2. That is, second power transmission coil 14 is provided on the side closer to the direction in which car 2 enters the power supply floor.

First power transmission unit 4 and second power transmission unit 5 that are connected to main power supply 3 transmit the power to the plurality of power reception units 7 established in car 2 in the contactless manner. Power reception unit 7 supplies the power to power storage portion 9 and load device 11 through charging circuit 8.

As the wireless power transfer system in the first embodiment, the case where an electromagnetic induction system is used will be described, but the wireless power transfer system is not limited thereto, and any method such as a magnetic field resonance system may be used. In addition, the case where main power supply 3 is a DC power supply will be described here, but main power supply 3 may be an AC power supply. In this case, an AC-DC converter may be provided between main power supply 3 and power transmission device 12.

Control panel 6 manages destination floor information and determines moving order. The destination floor is a floor selected by the elevator hall, an operation panel in car 2, or the like, and car 2 moves to a predetermined floor when a certain time elapses like a shuttle elevator.

For example, control panel 6 receives an input signal from a destination floor button (car call) operated by a passenger in car 2 using the operation panel established in car 2 and a button (elevator hall call) for an upper floor or a lower floor operated by a passenger in the elevator hall using the operation panel established in the elevator hall, and determines the destination floor (stopping floor) based on these pieces of information. Then, control panel 6 transmits the destination floor information to controller 16.

The measurement portion 10 measures a power storage residual amount of power storage portion 9 and transmits a measurement result to control panel 6. In addition, control panel 6 performs power supply necessity determination at the power supply floor based on the power storage residual amount of power storage portion 9.

In addition, controller 16 selects power transmission device 12 to be driven and outputs a power supply start and stop instruction to power transmission device 12 when receiving a signal in which power reception coil 17 enters a region where the power can be supplied to power transmission coils 13, 14. At this point, the signal output to controller 16 may be either an analog signal or a digital signal.

In this manner, control panel 6 receives various signals detected by car 2, an elevator hall device, the wireless power supply system, and the like. Then, various types of information such as the destination floor determined by control panel 6 are transmitted to car 2, the elevator hall device, controller 16 of the wireless power supply system, and the like.

In the first embodiment, because the control cable is not used, in principle communication between control panel 6 and car 2 is performed wirelessly, but the present invention is not limited thereto. Communication between control panel 6 and the elevator hall device may be performed in a wired or wireless manner, and communication between control panel 6 and controller 16 may be performed in a wired or wireless manner.

In the first embodiment, control panel 6 and controller 16 are separated, but control panel 6 may include controller 16. Alternatively, control panel 6 may perform all pieces of processing performed by controllers 16 provided in the respective power supply floors, and only control panel 6 may be established. In addition, controller 16 may perform a part of the processing performed by control panel 6. For example, the processing related to the wireless power supply system, such as the power supply necessity determination at the power supply floor, may be executed on the side of controller 16.

Although the case of a lithium ion battery will be described as power storage portion 9 in the elevator of the first embodiment, the present invention is not limited thereto, and other storage batteries such as a lead storage battery may be used.

For example, load device 11 is lighting, air conditioning, or the like in an elevator car, but is not limited thereto. In the first embodiment and embodiments described below, load device 11 is described as air conditioning.

Establishment places of controller 16, power transmission device 12, and power reception device 15 in the first embodiment are not limited to the positions illustrated in FIG. 1, but the establishment places are not limited thereto as long as similar functions and effects can be exhibited. For example, the plurality of power transmission devices 12 may be collectively disposed at positions away from the plurality of power transmission coils 13, 14, and the plurality of power reception devices 15 may be collectively disposed at positions away from the plurality of power reception coils 17.

The operation of the elevator of the first embodiment will be described below.

(a) Mode Setting

Figure 6:
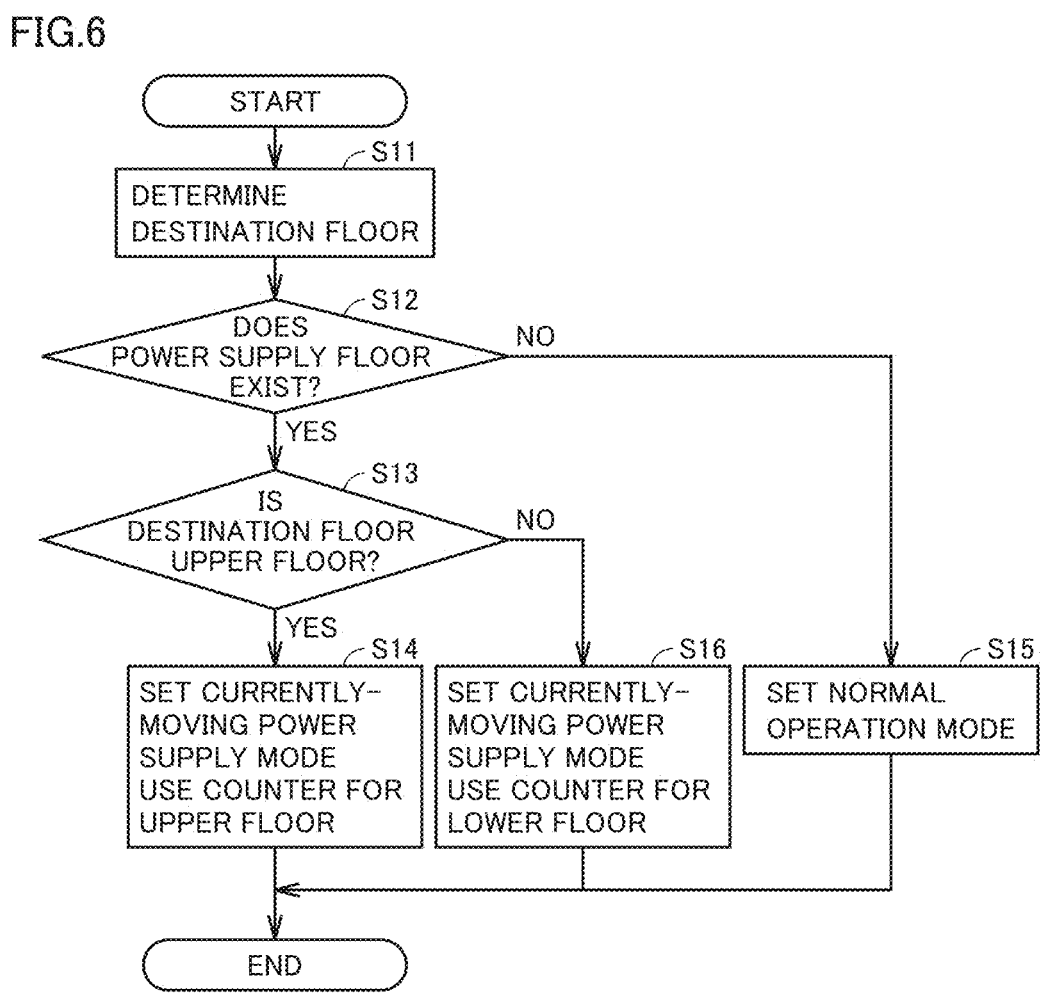

FIG. 6 is a flowchart illustrating mode setting processing executed by control panel 6. The mode setting process is processing for setting whether car 2 is to a currently-moving power supply mode or a normal operation mode. Hereinafter, a step is simply referred to as S.

The currently-moving power supply mode is a mode set when the destination floor to which car 2 is headed or the floor through which car 2 passes during movement is the power supply floor. The normal operation mode is a mode set when the currently-moving power supply is not performed at the power supply floor.

When a call from the passenger in car 2 or the passenger in the elevator hall is generated, the mode determination processing is started. Control panel 6 collects the calls from the passengers in car 2 or the passengers in the elevator hall and determines the destination floor.

When the mode setting process is started, control panel 6 determines the destination floor in S11, and advances the processing to S12. For example, when the destination button of the sixth floor is pressed in car 2 while car 2 is stopped on the second floor, the sixth floor is determined as the destination floor. When the elevator hall call button in the upward direction is pressed on the sixth floor while car 2 is stopped on the second floor, the sixth floor is determined as the destination floor of car 2.

In S12, control panel 6 determines whether the power supply floor exists. When car 2 is stopped, it is determined whether the power supply floor exists between the stopping floor and the destination floor. When car 2 is moving, it is determined whether the power supply floor exists between the floor to be entered next and the destination floor.

In the above example, when the power supply floor exists between the second floor and the sixth floor, it is determined that "the power supply floor exists" (YES in S12). When the destination button or the elevator hall call button is pressed on the floor in car 2 while car 2 is moving between the second floor and the third floor instead of stopping on the second floor, it is determined that the power supply floor exists when the power supply floor exists between the third floor and the sixth floor.

When it is determined that the power supply floor exists (YES in S12), the processing proceeds to S13. When it is determined that the power supply floor does not exist (NO in S12), the processing proceeds to S15. In S15, control panel 6 sets the normal operation mode and ends the mode setting processing.

In S13, control panel 6 determines whether the destination floor is an upper floor than the current floor (whether car 2 moves upward). When it is determined that the destination floor is the upper floor than the current floor (YES in S13), the processing proceeds to S14. When the destination floor is not the upper floor than the current floor (that is, the destination floor is a lower floor than the current floor, car 2 moves downward) (NO in S13), the processing proceeds to S16.

In S14, control panel 6 sets the power supply mode to the currently-moving power supply mode, determines that a coil proximity counter i for the upper floor is used, and ends the mode setting processing.

In S16, control panel 6 determines to set the power supply mode to the currently-moving power supply mode and to use the coil proximity counter j for the lower floor, and ends the mode setting process.

When the power supply mode is set to the currently-moving power supply mode, control panel 6 extracts the power supply floor on which the currently-moving power supply is to be performed next, and transmits the currently-moving power supply instruction to controller 16 of each power supply floor. When the destination floor does not exist, the power supply mode is set to the normal operation mode.

Sometimes the mode determination processing is executed not only when the call is made from the passenger in car 2 or the passenger at the elevator hall but also when the passenger does not exist in car 2 and the call is not made from the elevator hall. For example, there is the case where an option of always performing the operation in which car 2 returns to a reference floor (main floor such as the first floor) is applied as a specification of the elevator in the case where the passenger does not exist in car 2 and the call is not generated from the elevator hall. In such a case, when the reference floor is the power supply floor, the power supply can be performed every time car 2 returns to the power supply floor without the call.

In the first embodiment, the mode setting processing is executed by control panel 6, but the mode setting processing is not limited thereto, and may be executed by controller 16. In addition, control panel 6 may include controller 16 of the wireless power supply system.

(b) Currently-Moving Power Supply Processing (Entry to Power Supply Floor)

Figure 7:
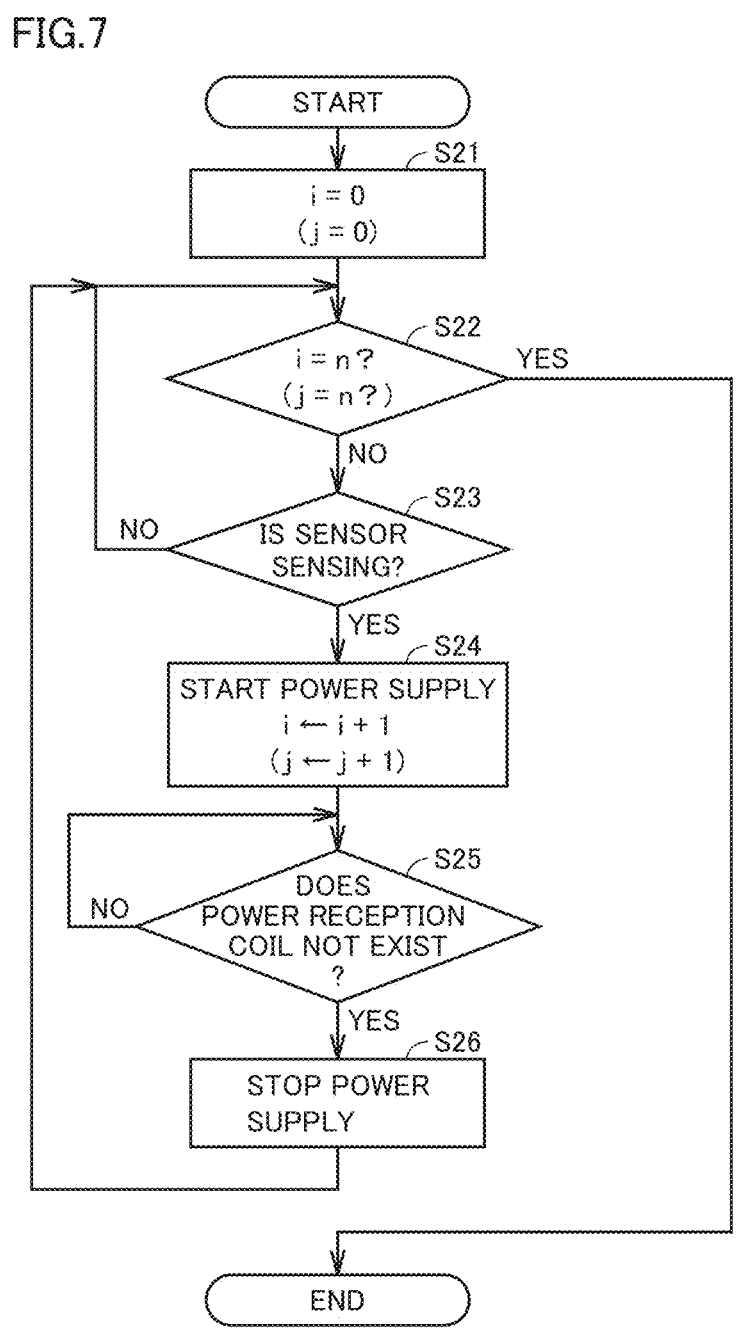

FIG. 7 is a flowchart illustrating currently-moving power supply processing executed by controller 16. After the mode setting processing described with reference to FIG. 6 is performed, when car 2 approaches the power supply floor where the currently-moving power supply is performed, control panel 6 outputs the currently-moving power supply instruction to controller 16 established in the power supply floor. When receiving the currently-moving power supply instruction from control panel 6, controller 16 executes the currently-moving power supply processing. In the currently-moving power supply processing, controller 16 performs processing for controlling the power transmission unit.

Coil approach counters i, j are used in the currently-moving power supply processing. Coil approach counter i is a counter used when it is set that the coil approach counter for the upper floor is used in S14. The coil approach counter j is a counter used when it is set that the coil approach counter for the lower floor is used in S16.

When power reception coil 17 approaches a predetermined region near second power transmission coil 14, a count of coil approach counter i or j is incremented by 1.

Here, whether power reception coil 17 is located in the region opposite to first and second power transmission coils 13, 14 may be determined from, for example, position detection existing in car 2 or the winding amount of the winding machine, or a position detection circuit may be newly established. The detection result is output to control panel 6, and the output signal may be either the analog signal or the digital signal.

"i" increases when power reception coil 17 approaches second power transmission coil 14 established at the lowermost portion of the power supply floor where car 2 approaches. j increases when power reception coil 17 approaches second power transmission coil 14 established at the uppermost portion of the power supply floor where car 2 approaches.

When i increases, second power transmission unit 5 established at the lowermost portion of the power supply floor to which car 2 approaches is driven, and when j increases, second power transmission unit 5 established at the uppermost portion of the power supply floor to which car 2 approaches is driven.

Hereinafter, a flowchart of the currently-moving power supply processing in FIG. 7 will be described with the power supply floor (uppermost floor) in FIG. 5 as an example. n is the number of power reception coils 17 established in car 2, and is a value determined when the elevator is established. In the first embodiment, n=4.

When the currently-moving power supply processing is started, controller 16 initializes coil approach counter i, j in 521. Specifically, coil approach counter i, j is set to zero as an initial value, and the processing proceeds to S22. At this point, coil approach counter i is a counter used when it is set that the coil approach counter for the upper floor is used in 514. The coil approach counter j is a counter used when it is set that the coil approach counter for the lower floor is used in S16.

In the example of FIG. 5, car 2 travels upward toward the uppermost floor that is the destination floor. When the destination floor is a floor higher than the floor where car 2 is currently located, power reception coil 17 provided in car 2 supplies the power during movement to second power transmission coil 14 established at the lowermost portion of the power supply floor (uppermost floor) when entering or stopping the power supply floor.

For this reason, coil approach counter i is used. Hereinafter, the case where coil approach counter i is used will be described with reference to the flowchart, but the same applies to the case where coil approach counter j is used.

In S22, controller 16 determines whether i=n. When determining that i=n (4) (YES in S22), controller 16 ends the currently-moving power supply processing. When determining that i=n is not satisfied (NO in S22), controller 16 advances the processing to S23. At the time when the processing starts, the processing proceeds to S23 because of i=0. When i=n is not satisfied, car 2 is before or during the passage through the power supply floor.

In S23, controller 16 determines whether a sensor is sensing. At this point, whether any one of power reception coils 17 established in car 2 is close to the region where the power can be supplied to second power transmission coil 14 is determined using the sensor. When it is determined that the sensor is sensing (YES in S23), the processing proceeds to 524. When it is determined that the sensor is not sensing (NO in S23), the processing returns to 522. This results in waiting until the sensor senses.

In S24, controller 16 starts the power supply, increases i by 1, and advances the processing to 525. In this case, because any one of power reception coils 17 established in car 2 is close to the region where the power can be supplied to second power transmission coil 14, controller 16 drives power transmission device 12 of second power transmission unit 5 established at the lowermost portion of the power supply floor (uppermost floor) to start the power supply.

In S25, controller 16 determines whether power reception coil 17 does not exist. In this case, it is determined whether power reception coil 17 established in car 2 is separated from second power transmission coil 14 and the predetermined region where the power can be supplied. When it is determined that power reception coil 17 does not exist (YES in S25), the processing proceeds to S26. While it is determined that power reception coil 17 exists (NO in S25), the processing remains in S24.

In S26, because power reception coil 17 is separated from the region where power can be supplied to second power transmission coil 14, controller 16 stops the power supply and advances the processing to S22.

When not determining that i=n (4) in S22 (NO in S22), controller 16 proceeds to S23 again. In this case, i=0 to 3, and all power reception coils 17 are not supplied by second power transmission coil 14.

When determining that i=n (4) in S22 (YES in S22), controller 16 ends the currently-moving power supply processing. In this case, i=4, and all power reception coils 17 are in the state of being power-supplied by second power transmission coil 14.

The position of car 2 and the stopping of car 2 may be determined from a stopping signal transmitted from control panel 6 to controller 16. Alternatively, the determination may be made from the winding amount of the winding machine, detection information of an existing position sensor, and the like. Upon receiving the stopping signal transmitted from control panel 6, controller 16 determines that car 2 is stopped.

As described above, while car 2 enters (passes through) the power supply floor, the power supply time can be secured for a longer time by performing the currently-moving power supply every time second power transmission coil 14 having a shape longer than usual with respect to the movement direction and power reception coil 17 are opposite to each other.

(c) Currently-Stopping Power Supply Processing

Figure 8:
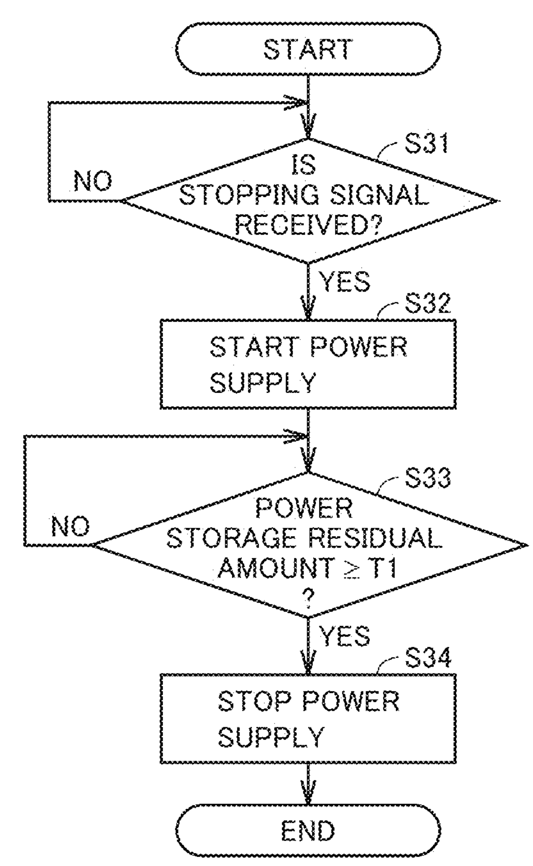
FIG. 8 is a flowchart illustrating currently-stopping power supply processing executed by the controller.

FIG. 8 is a flowchart illustrating currently-stopping power supply processing executed by controller 16.

When the currently-stopping processing is started, controller 16 determines whether the stopping signal transmitted from control panel 6 is received in S31. When it is determined that the stopping signal is received (YES in S31), the processing proceeds to S32. When it is determined that the stopping signal is not received (NO in S31), the processing of S31 is repeated.

In S32, controller 16 drives power transmission device 12 connected to first power transmission coil 13 to start the currently-stopping power supply.

In S33, controller 16 determines whether the power storage residual amount of power storage portion 9 is greater than or equal to a power supply threshold T1. When it is determined that the power storage residual amount of power storage portion 9 is greater than or equal to power supply threshold T1 (YES in S33), the processing proceeds to S34. When it is determined that the power storage residual amount of power storage portion 9 is less than power supply threshold T1 (NO in S33), the processing of S33 is repeated. That is, the power supply is continued until the power storage residual amount of power storage portion 9 becomes greater than or equal to power supply threshold T1.

In S34, controller 16 ends the currently-stopping power supply and ends the currently-stopping power supply processing.

As described above, the power supply between coils having the low coupling degree is avoided and the power supply between coils having the high coupling degree is performed at the time of stopping, so that the high power supply efficiency can be maintained.

In the first embodiment, the power supply stopping is determined when the power storage residual amount of power storage portion 9 becomes greater than or equal to power supply threshold T1, but the present invention is not limited thereto, and the power supply stopping may be determined according to the operation status of the elevator.

At the time of rush hour such as during a working hours in which many users exist, the threshold of power supply stopping in the currently-stopping power supply may be changed to T2 smaller than T1. In this way, the stopping time is not lengthened, so that a decrease in operation efficiency can be prevented.

Furthermore, at the time of rush hour, power supply may be stopped either when 10 seconds of the power supply time are elapsed or when power supply threshold T1 is exceeded. In this way, the power supply time (stopping time) can be made less than or equal to a certain value, and the decrease in operation efficiency can be prevented.

As described above, the power supply is stopped according to a determination criterion previously determined according to the operation status (the time period, the number of users) of the elevator, so that the decrease in operation efficiency can be prevented.

In addition, when car 2 causes power storage portion 9 to store the power at the power supply floor and when the storage residual amount of power storage portion 9 is less than or equal to a predetermined threshold, controller 16 may cause power transmission device 12 to supply the power to second power transmission coil 14 while causing power transmission device 12 to supply the power to first power transmission coil 13.

In this way, the rapid charging can be performed according to the power storage residual amount of power storage portion 9, so that the decrease in operation efficiency can be prevented.

As described above, in the first embodiment, first and second power transmission coils 13, 14 and power transmission devices 12 as many as first and second power transmission coils 13, 14 are provided in the power supply floor, second power transmission coil 14 has the shape longer than first power transmission coil 13 with respect to the moving direction, it is determined whether power reception coil 17 established on the side surface of car 2 exists in the region where the power can be supplied to second power transmission coil 14 when car 2 passes through or enters the power supply floor, and the power is transmitted from second power transmission coil 14 to opposite power reception coil 17 in the contactless manner when the power reception coil exists in the region where the power can be supplied, so that the longer power supply time can be secured.

When the middle floor is the power supply floor, it is conceivable that car 2 passes through without stopping at the power supply floor. In this case, currently-moving power supply is performed again based on the flowchart operation in FIG. 7 after currently-moving power supply is performed.

In addition, when car 2 passes through the power supply floor, it is conceivable that two power reception coils 17 established at the uppermost and lowermost positions of car 2 and two second power transmission coils 14 established at the power supply floor simultaneously approach each other.

In this case, after it is checked whether two power reception coils 17 approach two second power transmission coils 14, two power reception coils 17 may simultaneously perform the currently-moving power supply. On the other hand, when two power reception coils 17 are separated from two second power transmission coils 14 and the region where the power can be supplied, two power reception coils 17 simultaneously stop the currently-moving power supply.

In addition, in the middle floor where the power supply can be performed other than the uppermost and lowermost floors, there may be the case where car 2 only passes through without almost stopping.

Accordingly, first and second power transmission units 4, 5 may be established such that first power transmission coil 13 and second power transmission coil 14 are established in order of proximity to the moving direction of car 2, and basically, only currently-moving power supply using second power transmission coil 14 is performed at the middle power supply floor, and first power transmission coil 13 may be used as a role of detecting that car 2 approaches the power supply floor.

Figure 9:
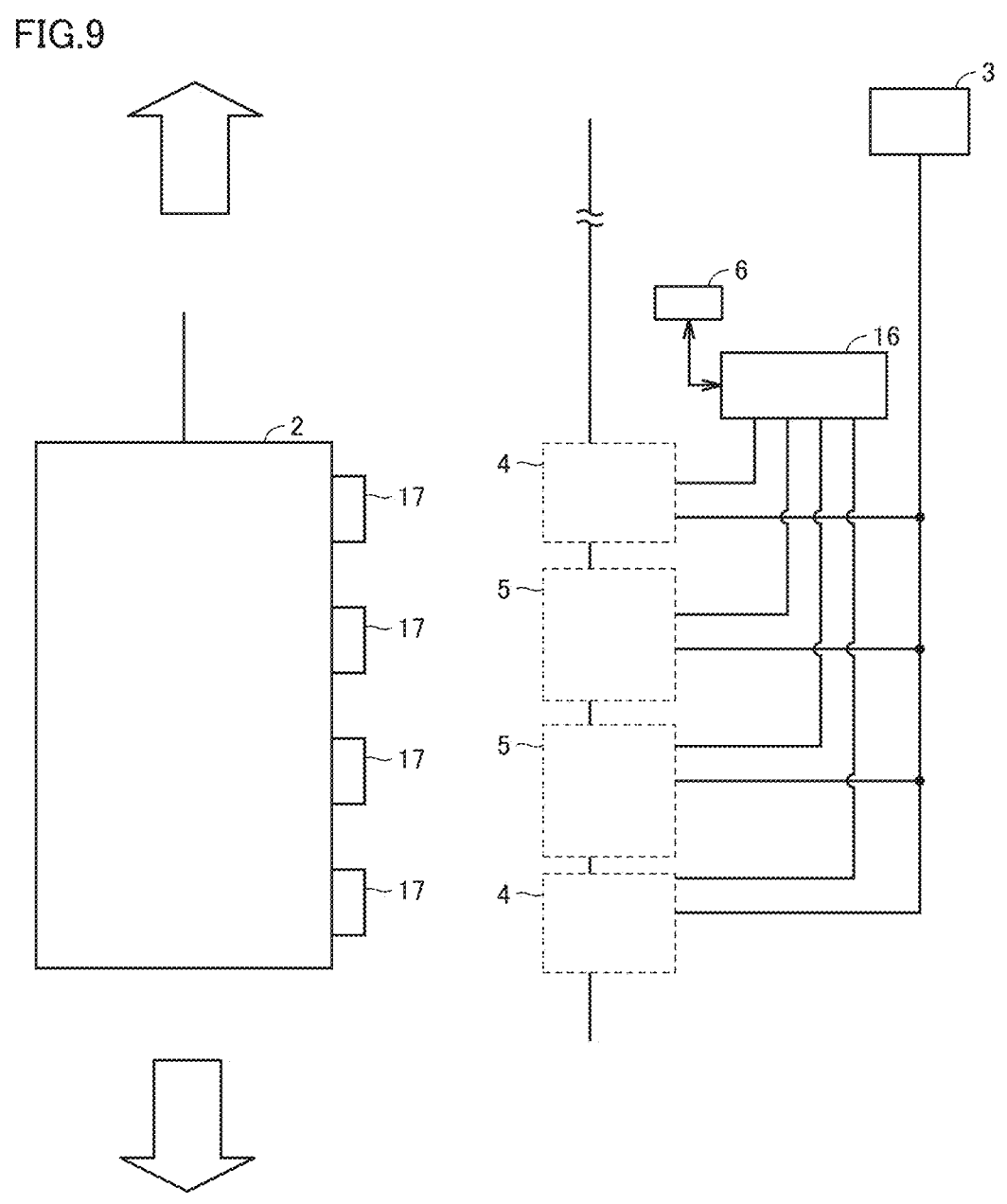

FIG. 9 is a view illustrating an example in which the wireless power supply system is established on the stopping floor. In FIG. 9, first power transmission coil 13 and second power transmission coil 14 are established in the order of proximity from the entering direction of car 2 at the power supply floor other than the uppermost and lowermost floors in hoistway 1. When first power transmission coil 13 detects that power reception coil 17 approaches, controller 16 drives power transmission device 12 connected to second power transmission coil 14 to perform the currently-moving power supply. When car 2 moves and when power reception coil 17 is separated from first power transmission coil 13, controller 16 stops the drive of power transmission device 12 connected to second power transmission coil 14 and stops the currently-moving power supply. When car 2 further moves and when next power reception coil 17 approaches first power transmission coil 13, the same operation as the currently-moving charging operation to previous power reception coil 17 is performed. Thereafter, a series of operations is repeated until car 2 is separated from the region where the power can be supplied to second power transmission coil 14.

As described above, when first power transmission coil 13 and second power transmission coil 14 are established in order of proximity to the moving direction of car 2 in the power supply floors other than the uppermost and lowermost floors, first power transmission coil 13 detects whether moving power reception coil 17 exists in the region where the power can be supplied to second power transmission coil 14, and controller 16 performs the currently-moving power supply from second power transmission coil 14 to opposite power reception coil 17, so that the longer power supply time can be secured.

In the currently-moving power supply of the first embodiment, the case where the contactless power transmission is performed from only second power transmission coil 14 to power reception coil 17, and the power transmission is performed from only first power transmission coil 13 to power reception coil 17 in the currently-stopping power supply has been described. However, the present invention is not limited to this. For example, in the currently-moving power supply and the currently-stopping power supply, the power supply may be simultaneously performed from both first and second power transmission coils 13, 14. Alternatively, the contactless power transmission may be performed only from first power transmission coil 13 to power reception coil 17 in the currently-moving power supply, and the power transmission may be performed only from second power transmission coil 14 to power reception coil 17 in the currently-stopping power supply.

As described above, the power transmission coil that transmits the power to power reception coil 17 may be either first power transmission coil 13 or second power transmission coil 14 regardless of the power supply during the movement and the currently-stopping power supply, and the power may simultaneously be supplied.

In addition, in the first embodiment, the case where the currently-moving power supply is performed at all the power supply floors during the movement to the destination floor has been described, but the present invention is not limited thereto.

For example, in the case where controller 16 determines whether to cause power storage portion 9 to store the power when passing through the power supply floor according to the power storage residual amount of power storage portion 9 or the operation status of car 2, the power may be caused to be supplied from power transmission device 12 to second power transmission coil 14.

Specifically, when car 2 performs the currently-moving power supply on the power supply floor and the power storage residual amount of power storage portion 9 becomes greater than or equal to a predetermined threshold, control panel 6 switches to the normal operation mode and determines not to perform the currently-moving power supply on the power supply floor passing through until the destination floor. That is, the currently-moving power supply is performed when the power storage residual amount is small, so that the stopping time due to the currently-stopping power supply can be shortened.

Alternatively, the power supply floors for performing the currently-moving power supply may be divided according to the time period, and only the power supply floor during the movement to the destination floor may perform the currently-moving power supply to car 2. For example, when the number of power supply floors that perform the currently-moving power supply is increased at the time of rush hours such as the working hours, the stopping time due to the currently-stopping power supply does not become long at the time of rush hours.

As described above, because the currently-moving power supply is performed based on the power storage residual amount or the operation status of power storage portion 9, the stopping time at the power supply floor can be shortened, so that the decrease in operation efficiency can be prevented.

Second Embodiment

A wireless power supply system according to a second embodiment will be described below.

In the wireless power supply system of the second embodiment, the power transmission unit further includes a switching portion that switches whether to electrically connect power transmission device 12 and first power transmission coil 13 or whether to electrically connect power transmission device 12 and second power transmission coil 14. Controller 16 switches the switching portion, and controls whether the power is supplied from power transmission device 12 to first power transmission coil 13 or second power transmission coil 14. The switching portion includes first and second power transmission coil switching portions 61, 62.

Specifically, in the wireless power supply system described in the first embodiment, hoistway 1 and car 2 that moves in hoistway 1 are provided, power reception unit 7, load device 11, and power storage portion 9 are provided in car 2, first power transmission unit 4 includes power transmission device 12 and first power transmission coil 13, second power transmission unit 5 includes power transmission device 12 and second power transmission coil 14, and second power transmission coil 14 is the coil having the shape longer than first power transmission coil 13 in the moving direction of car 2.

On the other hand, in the wireless power supply system according to the second embodiment, first and third power transmission units 4, 51 are provided in hoistway 1, third power transmission unit 51 includes power transmission device 12, first and second power transmission coils 13, 14, and first and second power transmission coil switching portions 61, 62, and first and second power transmission coil switching portions 61, 62 are configured to switch between ON and OFF of the switch such that first and second power transmission coils 13, 14 opposite to power reception coil 17 supply the power when car 2 enters the power supply floor.

As described above, when the switching portion is switched according to the operation status of car 2, charging power is maintained while power transmission device 12 is shared, so that the plurality of power transmission coils can be driven.

Hereinafter, the wireless power supply system of the second embodiment will be described focusing on differences from the wireless power supply system of the first embodiment.

Figure 10:
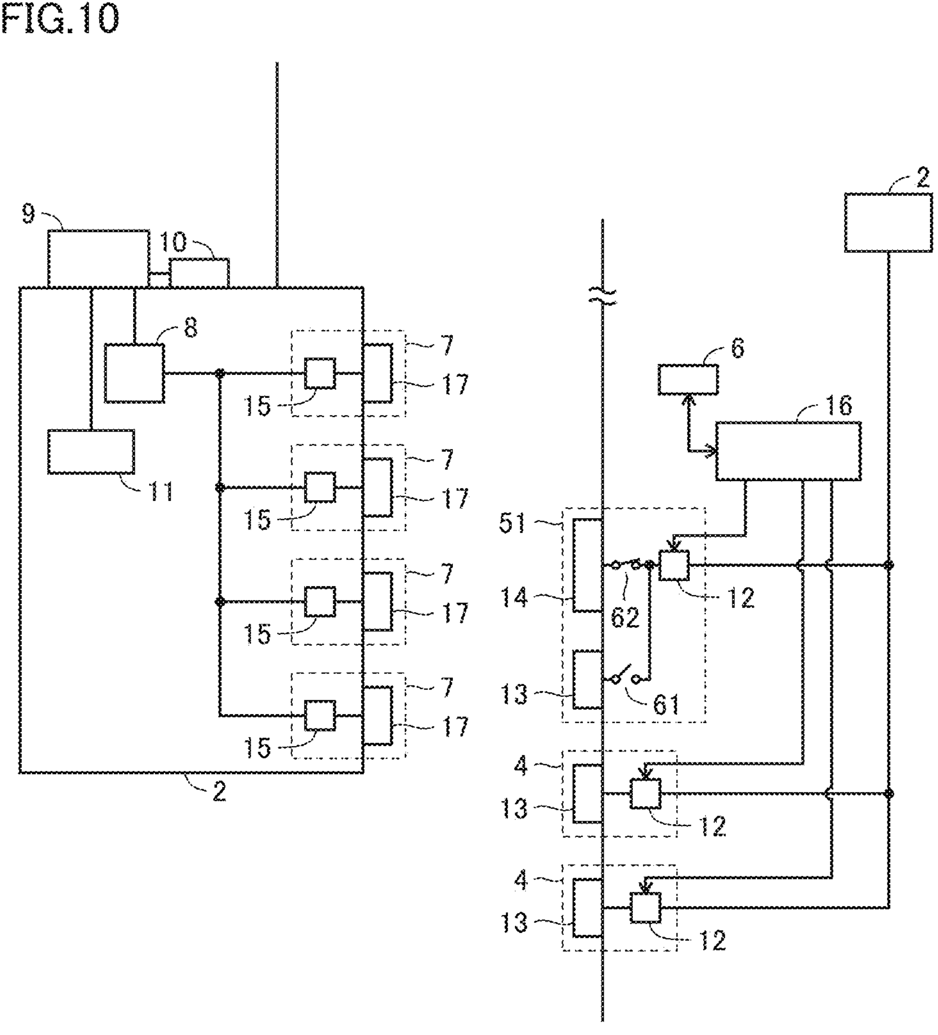
FIG. 10 is a configuration diagram illustrating a wireless power supply system according to a second embodiment.
Figure 11:
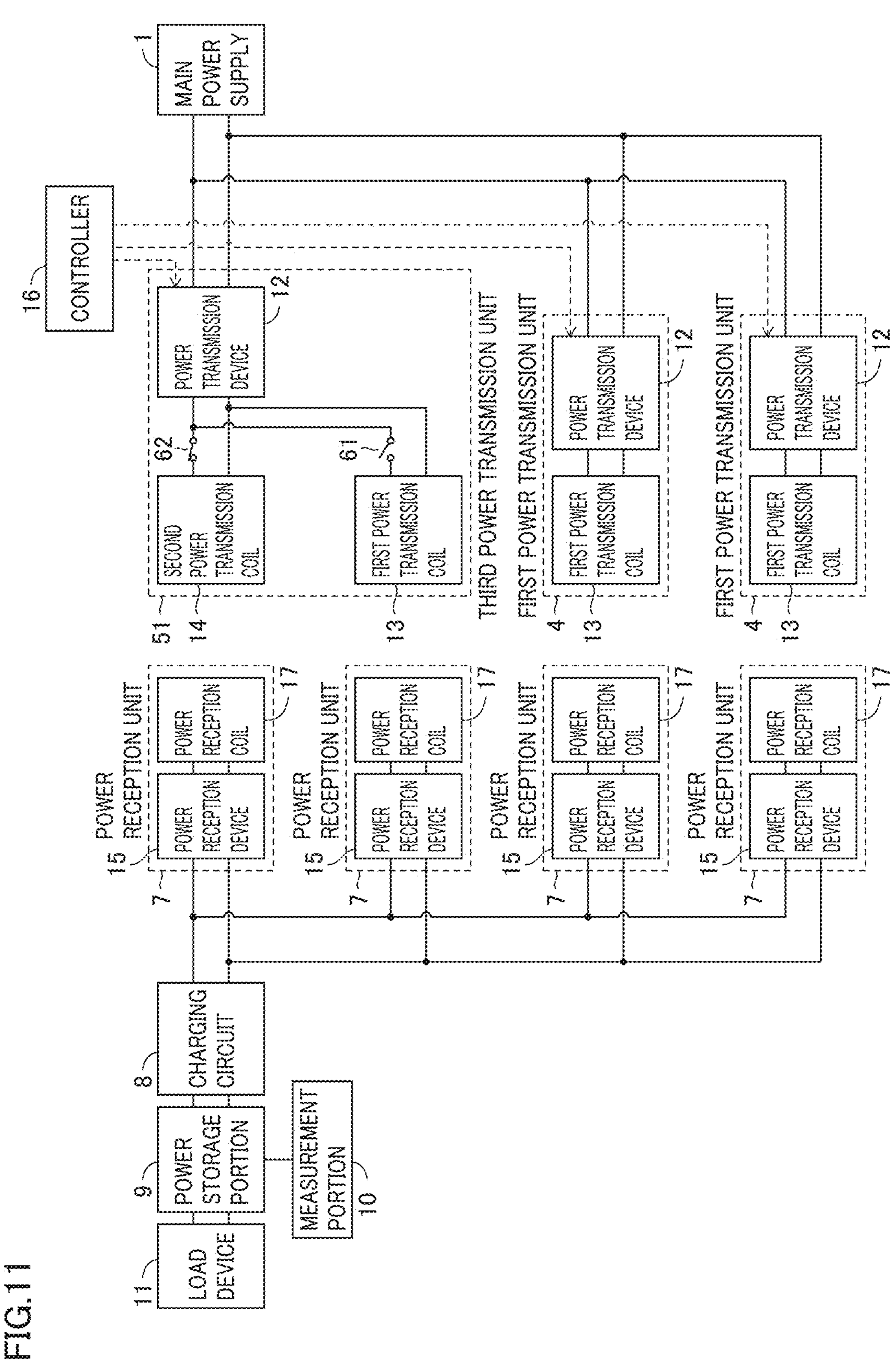
FIG. 11 is a circuit block diagram of the wireless power supply system.

FIG. 10 is a configuration diagram illustrating the wireless power supply system of the second embodiment. FIG. 11 is a circuit block diagram of the wireless power supply system. In FIGS. 10 and 11, the same reference numerals are given to the same components.

The main configuration is similar to that of FIGS. 1 and 2, but unlike FIG. 1, a third power transmission unit 51 is provided in hoistway 1.

In a situation where car 2 performs the currently-moving power supply, controller 16 determines whether second power transmission coil 14 and power reception coil 17 are close to the region where the power can be supplied, and switches the power transmission coil connected to power transmission device 12. Thus, one power transmission device 12 can supply power to the plurality of power transmission coils without changing the charge amount to load device 11.

Control panel 6 performs the power supply necessity determination at the power supply floor based on the power storage residual amount of power storage portion 9. In the elevator according to the second embodiment, power storage portion 9 may be a lithium ion battery or a lead storage battery.

Although the case where power storage portion 9 in the second embodiment is the lithium ion battery will be described, power storage portion 9 is not limited thereto, but another power storage portion 9 may be used.

The establishment places of first and second power transmission coil switching portions 61, 62, power transmission device 12, and power reception device 15 in the second embodiment are not limited to the positions in FIG. 10, and are not limited thereto as long as the establishment places can exhibit similar functions and effects.

Although control panel 6 and controller 16 are separated in the second embodiment, control panel 6 may include controller 16. Alternatively, control panel 6 may be responsible for the function of controller 16, and only control panel 6 may be used.

Figure 12:
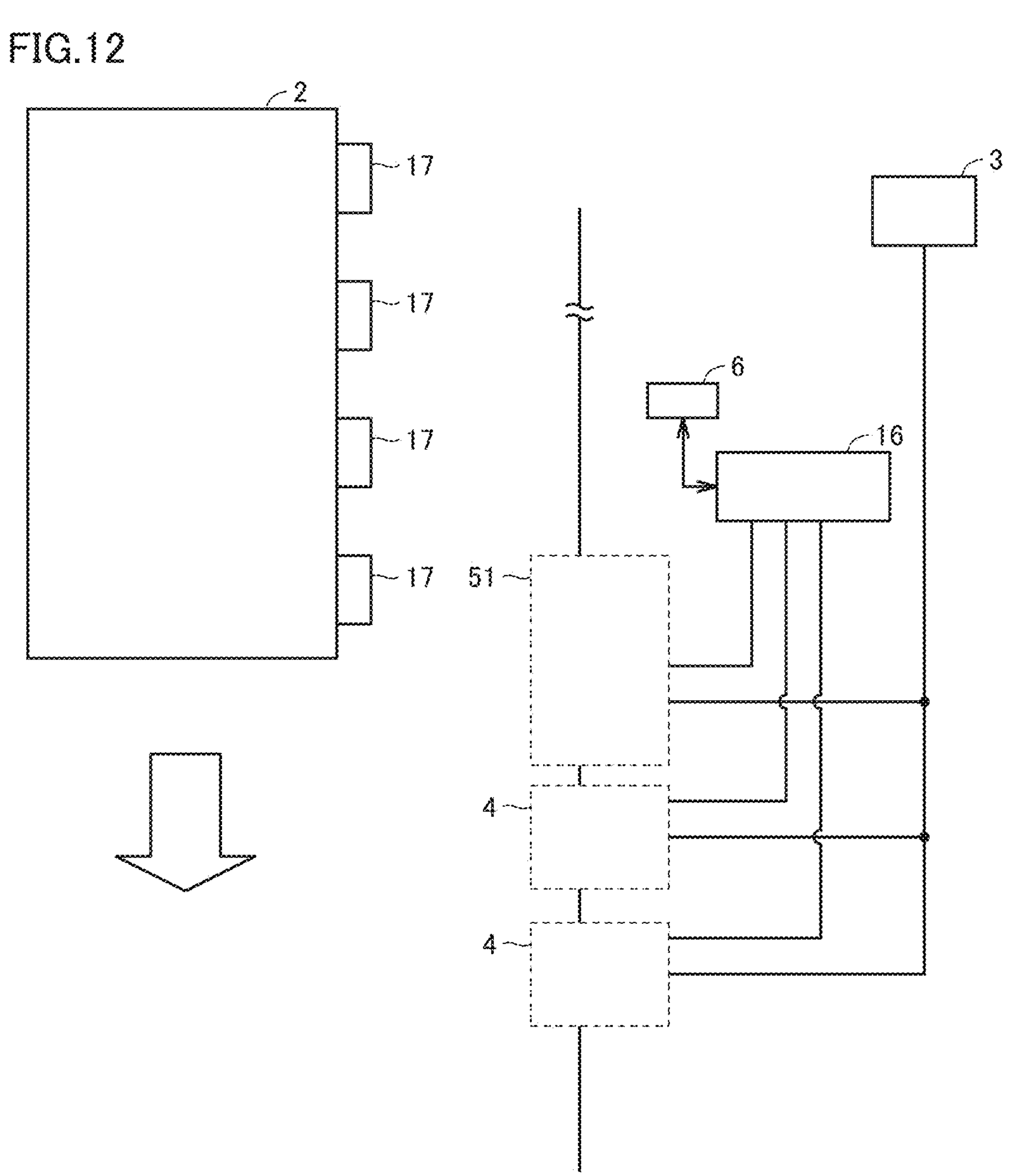
FIG. 12 is a view illustrating an example in which the wireless power supply system is established on the stopping floor.
Figure 13:
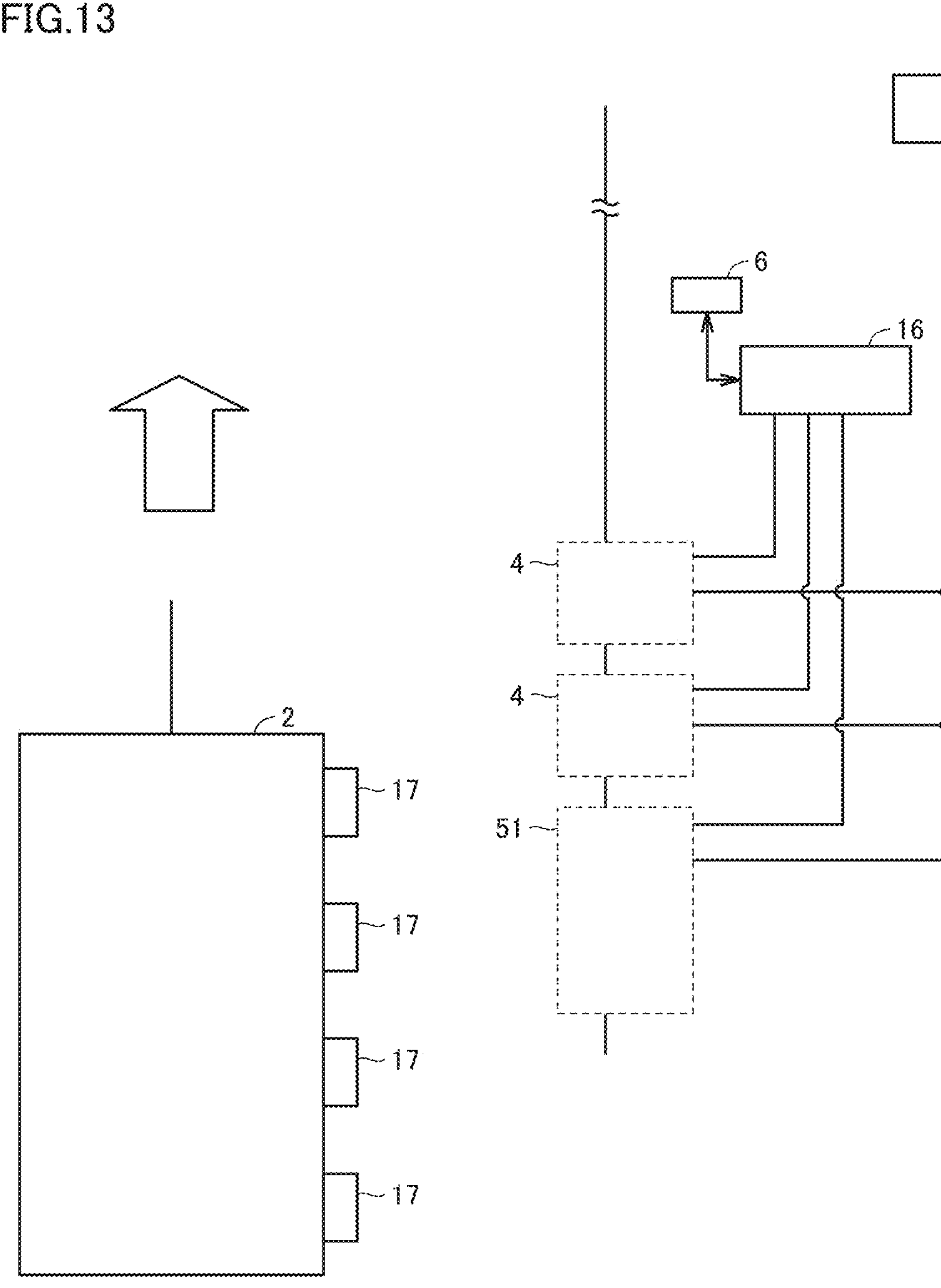
FIG. 13 is a view illustrating an example in which the wireless power supply system is established on the stopping floor.
Figure 14:
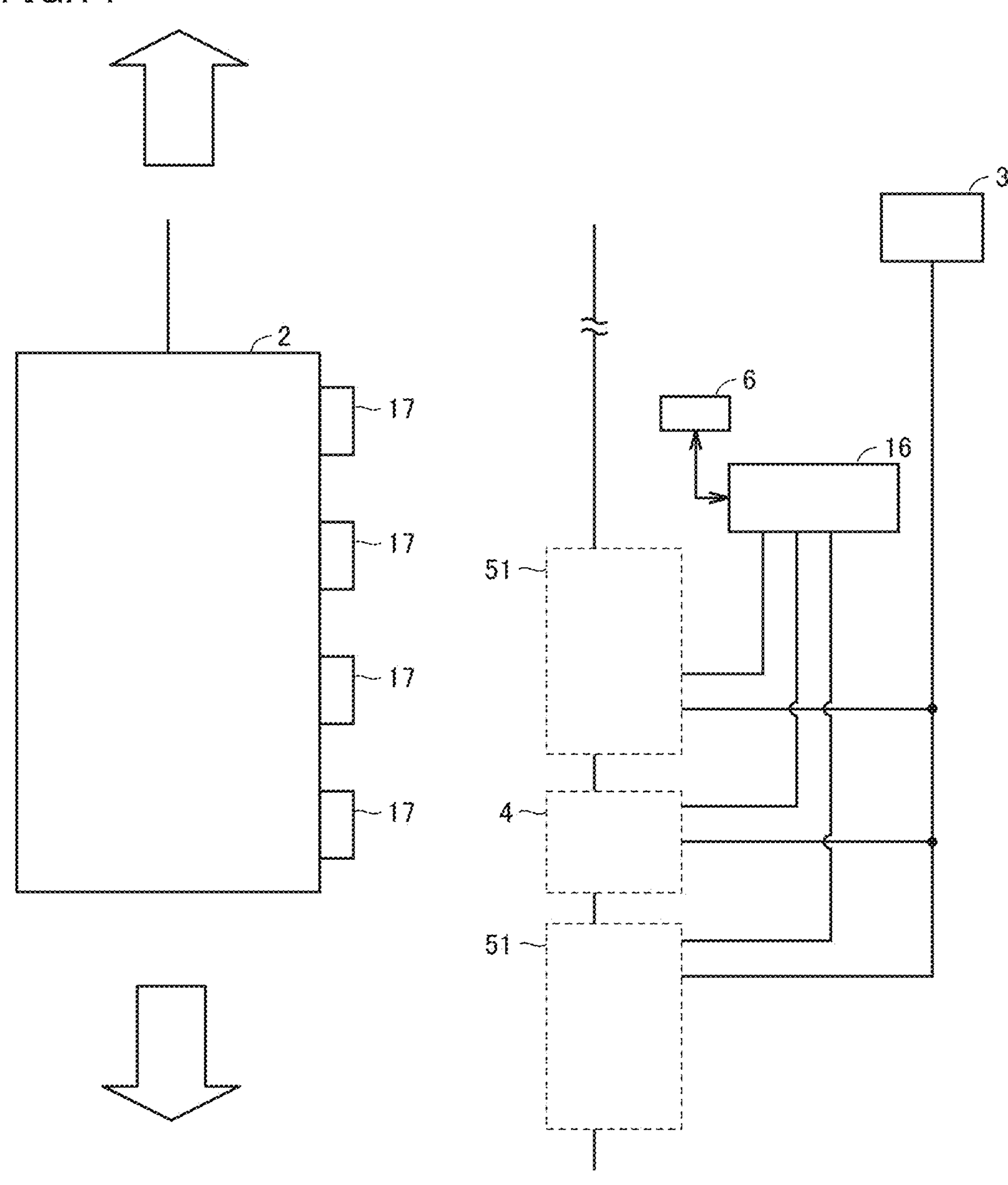
FIG. 14 is a view illustrating an example in which the wireless power supply system is established on the stopping floor.

FIGS. 12 to 14 are views illustrating examples in which the wireless power supply system is established on the stopping floor. First power transmission coil 13 and second power transmission coil 14 are established on the wall surface of hoistway 1 of the power supply floor, and the power is transmitted to power reception coil 17 in the contactless manner when car 2 approaches and stops at the power transmission coil established on the wall surface of hoistway 1.

FIG. 12 illustrates the example in which the noncontact power supply device is established on the lowermost floor, FIG. 13 illustrates the example in which the noncontact power supply device is established on the uppermost floor, and FIG. 14 illustrates the example in which the noncontact power supply device is established on the middle floor, namely, the floor other than the lowermost floor and the uppermost floor.

The main configuration and installation are similar to those in FIG. 3, but different from FIG. 3, some of second power transmission unit 5 become third power transmission unit 51, and first and second power transmission coils 13, 14 have one power transmission device 12.

As illustrated in FIG. 14, a plurality of third power transmission units 51 may be provided on the power supply floor in the middle of hoistway 1. In this case, second power transmission coil 14 is established so as to be uppermost and lowermost.

The currently-moving power supply operation in the uppermost floor of FIG. 13 will be described below.

(a) Mode Setting

In control panel 6, the mode setting processing for setting the operation of car 2 on the power supply floor to either the currently-moving power supply mode or the normal operation mode is similar to that described with reference to FIG. 6 in the first embodiment, so that the detailed description thereof will be omitted.

(b) Currently-Moving Power Supply Processing (Entry to Power Supply Floor)

FIG. 15 is a flowchart illustrating the currently-moving power supply processing executed by controller 16. In the currently-moving power supply processing, controller 16 controls first and third power transmission units 51.

Because the main configuration is similar to the operation in FIG. 7 of the first embodiment, different operations will be mainly described, and description of similar operations will be omitted.

From the determination in FIG. 6, when car 2 approaches the power supply floor on which the currently-moving power supply is performed, control panel 6 outputs the currently-moving power supply instruction to controller 16 established on the power supply floor. When the currently-moving power supply processing is started, i and j are set to an initial value of zero (S41).

Subsequently, upon receiving the currently-moving power supply instruction, controller 16 turns on a second power transmission coil switching portion 62 and turns off a first power transmission coil switching portion 61 so as to connect power transmission device 12 and second power transmission unit 5 (S42).

As described above, when car 2 performs the currently-moving power supply at the power supply floor, only second power transmission coil 14 is connected to power transmission device 12 before car 2 approaches the power supply floor, and first power transmission coil switching portion 61 is switched to OFF and second power transmission coil switching portion 62 is switched to ON, whereby the currently-moving power supply can be performed without reducing the charging power even in the configuration in which first and second power transmission coils 13, 14 share one power transmission device 12.

Thereafter, the currently-moving power supply operation is performed as in the first embodiment (S43 to S48). When car 2 enters the power supply floor from the lower part of the hoistway and when second power transmission coil 14 and power reception coil 17 approach the region where the power can be supplied (YES in S44), coil approach counter i is incremented by 1, and controller 16 drives power transmission device 12 to transmit the power from second power transmission coil 14 to power reception coil 17 in the contactless manner (S45).

When coil approach counter i=n (n is the number of power reception coils 17 established in car 2) (YES in S43), controller 16 ends the currently-moving power supply.

(c) Currently-Stopping Power Supply Processing

Figure 16:
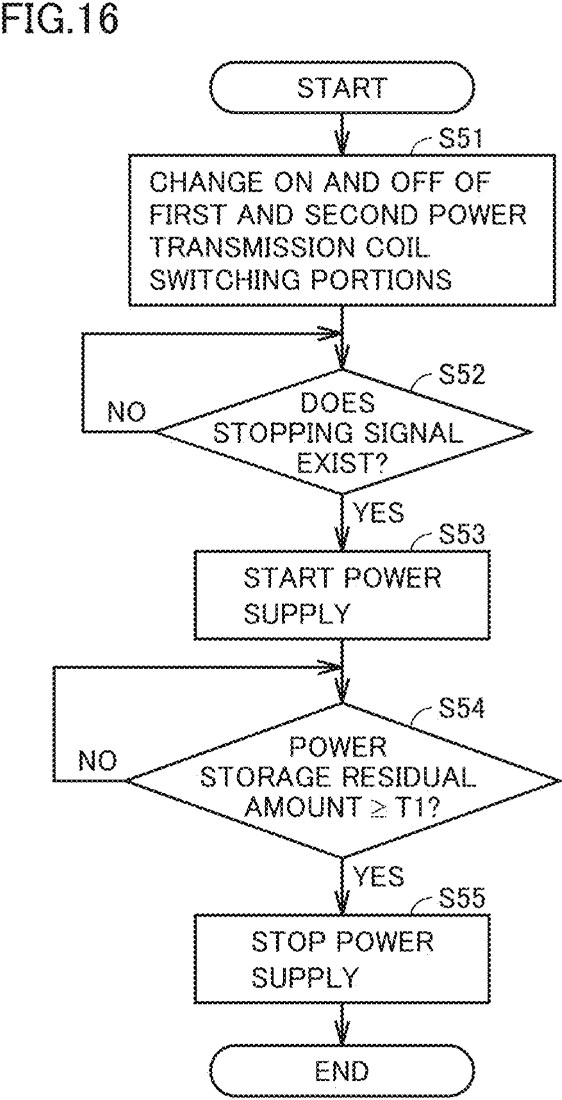
FIG. 16 is a flowchart illustrating currently-stopping power supply processing executed by the controller.

FIG. 16 is a flowchart illustrating the currently-stopping power supply processing executed by controller 16. In the currently-stopping power supply processing, controller 16 controls first and third power transmission units 4, 51.

In the second embodiment, currently-stopping power supply is performed similarly to the first embodiment. Because the main configuration is similar to the operation of FIG. 8 of the first embodiment, different operations will be mainly described, and description of similar operations will be omitted.

When the currently-stopping power supply processing in FIG. 15 is ended, controller 16 can execute the currently-stopping power supply operation. When the currently-stopping power supply processing is started, first power transmission coil switching portion 61 is turned ON and second power transmission coil switching portion 62 is turned OFF such that only first power transmission coil 13 is connected to power transmission device 12 (S51).

As described above, when the currently-moving power supply operation is ended, first and second power transmission coil switching portions 61, 62 are turned on and off such that only first power transmission coil 13 is connected to power transmission device 12, whereby the power can be supplied while the high efficiency is maintained in the currently-stopping power supply without reducing the charging power even in the configuration in which one power transmission device 12 is shared.

Thereafter, controller 16 drives power transmission device 12 to transmit the power from first power transmission coil 13 to power reception coil 17 in the contactless manner (S52 to S55). Because the operation of the currently-stopping power supply is similar to the operation described with reference to FIG. 8 in the first embodiment, the detailed description thereof will be omitted here.

As described above, in the second embodiment, first and third power transmission units 4, 51 are provided in the power supply floor, third power transmission unit 51 includes first and second power transmission coils 13, 14, power transmission device 12, and the switches of first and second power transmission coil switching portions 61, 62, and before car 2 performs the currently-moving power supply at the power supply floor, second power transmission coil switching portion 62 is turned on and first power transmission coil switching portion 61 is turned off so as to connect second power transmission coil 14 and power transmission device 12. Therefore, even in the configuration in which first and second power transmission coils 13, 14 share one power transmission device 12, the longer power supply time can be secured by performing the currently-moving power supply from second power transmission coil 14 having the shape longer in the traveling direction than first power transmission coil 13 to power reception coil 17 without reducing the charging power amount.

Furthermore, first power transmission coil switching portion 61 is turned on and second power transmission coil switching portion 62 is turned off so as to connect first power transmission coil 13 and power transmission device 12 before performing the currently-stopping power supply at the power supply floor. Therefore, even in the configuration in which first and second power transmission coils 13, 14 share one power transmission device 12, low-efficiency power supply between coils having the low coupling degree can be avoided to maintain high-efficiency power supply between high coils without reducing the charging power amount.

At this point, when the power supply floor is the middle floor, it is conceivable that car 2 passes without stopping at the power supply floor. In this case, controller 16 determines whether to pass through the power supply floor or stop at the power supply floor from the information previously sent from control panel 6. In the case of passing, after the currently-moving power supply is performed, the currently-moving power supply is performed again based on the flowchart operation in FIG. 15.

In addition, when car 2 passes through the power supply floor, it is conceivable that two power reception coils 17 established at the uppermost and lowermost positions of car 2 and two second power transmission coils 14 established at the power supply floor simultaneously approach each other.

In this case, similarly to the currently-moving power supply at the uppermost floor, after whether two power reception coils 17 approach two second power transmission coils 14 is checked, the currently-moving power supply is simultaneously performed by the two power reception coils. On the other hand, when two power reception coils 17 are separated from two second power transmission coils 14 and the region where the power can be supplied, two power reception coils 17 simultaneously stop the currently-moving power supply.

In addition, it is conceivable that car 2 only passes through the middle floor on which the power supply can be performed other than the uppermost and lowermost floors without almost stopping.

In this case, first and third power transmission units 51 may be established such that first power transmission coil 13 and second power transmission coil 14 are established in order of proximity to the moving direction of car 2, basically only currently-moving power supply using second power transmission coil 14 is performed at the middle power supply floor, and first power transmission coil 13 may be used as a role of detecting that car 2 approaches the power supply floor.

For example, two third power transmission units 51 are provided in the middle of the power supply floor, and two first power transmission coils 13 and two second power transmission coils 14 are established in order of first power transmission coil 13, second power transmission coil 14, first power transmission coil 13, and second power transmission coil 14 from the upper portion to the lower portion of the hoistway.

In addition, first and second power transmission coils 13, 14 connected to the same power transmission device 12 are established so as not to be adjacent to each other.

In this case, before car 2 arrives at the power supply floor, controller 16 turns on first power transmission coil switching portion 61 of one third power transmission unit 51 and turns off second power transmission coil switching portion 62 such that power transmission device 12 included in the one third power transmission unit 51 and first power transmission coil 13 are connected to each other.

Furthermore, controller 16 turns off first power transmission coil switching portion 61 of the other third power transmission unit 51 and turns on second power transmission coil switching portion 62 such that power transmission device 12 included in the other third power transmission unit 51 and second power transmission coil 14 are connected to each other.

When first power transmission coil 13 included in one third power transmission unit 51 detects that power reception coil 17 approaches, controller 16 drives power transmission device 12 included in the other third power transmission unit 51, and performs the currently-moving power supply from second power transmission coil 14 to power reception coil 17.

However, in the case of this configuration, the currently-moving power supply is performed only from one second power transmission coil 14 of two second power transmission coils 14.

When car 2 moves to separate power reception coil 17 from first power transmission coil 13 included in one third power transmission unit 51, controller 16 stops the drive of power transmission device 12 connected to second power transmission coil 14 included in the other third power transmission unit 51 and stops the currently-moving power supply. When car 2 further moves and when next power reception coil 17 approaches first power transmission coil 13 included in one of third power transmission units 51, the same operation as the currently-moving charging operation to previous power reception coil 17 is performed.

Thereafter, a series of operations is repeated until car 2 is separated from the region where the power can be supplied to second power transmission coil 14.

As described above, when first and third power transmission units 4, 51 are provided such that first power transmission coil 13 and second power transmission coil 14 are established in order of proximity to the moving direction of car 2 at the power supply floors other than the uppermost and lowermost floors, first power transmission coil 13 detects whether moving power reception coil 17 exists in the region where the power can be supplied to second power transmission coil 14, and controller 16 performs the currently-moving power supply from second power transmission coil 14 to opposite power reception coil 17, whereby the power supply time can be secured longer.

At this point, the case where two third power transmission units 51 are established has been described, but the present invention is not limited thereto, and first, second, and third power transmission units 51 may be established as long as the same effect can be obtained.

In the first and second exemplary embodiments, the case where the contactless power transmission is performed from only second power transmission coil 14 to power reception coil 17 in the currently-moving power supply, and the power transmission is performed from only first power transmission coil 13 to power reception coil 17 in the currently-stopping power supply has been described. However, the present disclosure is not limited to this. For example, the power supply may be simultaneously performed from first and second power transmission coils 13, 14 during the currently-moving power supply and the currently-stopping power supply. Alternatively, the contactless power transmission may be performed from only first power transmission coil 13 to power reception coil 17 in the currently-moving power supply, and the power transmission may be performed from only second power transmission coil 14 to power reception coil 17 in the currently-stopping power supply.

As described above, the power transmission coil that transmits the power to power reception coil 17 may be either first power transmission coil 13 or second power transmission coil 14 regardless of the currently-moving power supply and the currently-stopping power supply, and the power supply may simultaneously be performed.

In addition, the case where the currently-moving power supply is performed at all the power supply floors during the movement to the destination floor has been described this time, but the present invention is not limited thereto.

For example, when car 2 performs the currently-moving power supply on the power supply floor and the power storage residual amount of power storage portion 9 becomes greater than or equal to a predetermined threshold, control panel 6 may switch to the normal operation mode and may not perform the currently-moving power supply on the power supply floor passing between car 2 and the destination floor.

Alternatively, the power supply floors on which the currently-moving power supply is performed may be divided according to the time period, and only the power supply floor during the movement to the destination floor may perform the currently-moving power supply to car 2.

Third Embodiment

A wireless power supply system according to a third embodiment will be described below.

In the wireless power supply system of the third exemplary embodiment, a plurality of second power transmission coils 14 are provided along hoistway 1 on the power supply floor. The power transmission unit further includes a switching portion that switches whether to electrically connect power transmission device 12 and any one of the plurality of second power transmission coils 14. Controller 16 switches the switching portion according to the traveling direction of car 2, and selects second power transmission coil 14 that supplies the power from power transmission device 12. The switching portion includes third and fourth power transmission coil switching portions 63, 64.

In the wireless power supply system of the second embodiment, hoistway 1, car 2 moving in hoistway 1, and first and third power transmission units 4, 51 are provided, third power transmission unit 51 includes power transmission device 12, first and second power transmission coils 13, 14, and first and second power transmission coil switching portions 61, 62, and first and second power transmission coil switching portions 61, 62 are configured to switch between ON and OFF of the switch such that second power transmission coil 14 opposite to power reception coil 17 is connected to power transmission device 12 when car 2 performs the currently-moving power supply on the power supply floor.

On the other hand, in the wireless power supply system of the third embodiment, first and fourth power transmission units 4, 52 are provided in the power supply floor established in the middle floor other than the uppermost and lowermost floors in hoistway 1, fourth power transmission unit 52 includes power transmission device 12, two second power transmission coils 14, and third and fourth power transmission coil switching portions 63, 64, and third and fourth power transmission coil switching portions 63, 64 are configured to switch between ON and OFF of the switch such that one of second power transmission coils 14 opposite to power reception coil 17 when car 2 enters the power supply floor is connected to power transmission device 12. At least three second power transmission coils 14 may be switched by the switching portion.

In this way, when the switching portion is switched according to the operation status of car 2, the power supply power is maintained while power transmission device 12 is shared, so that the currently-moving power supply and the currently-stopping power supply can performed.

Hereinafter, a wireless power supply system of the third embodiment will be described focusing on differences from the wireless power supply system of the second embodiment.

Figure 17:
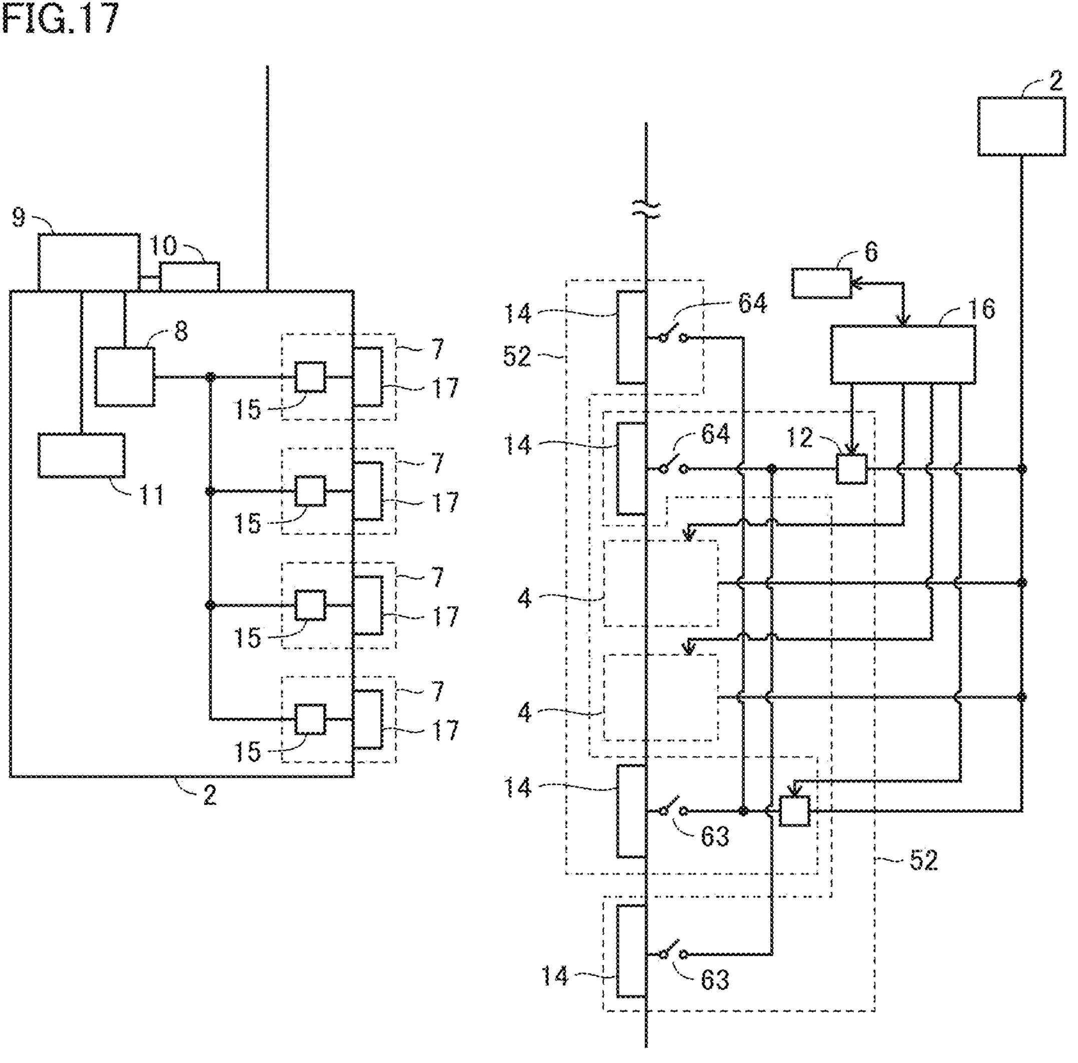
FIG. 17 is a configuration diagram illustrating a wireless power supply system according to a third embodiment.

FIG. 17 is a configuration diagram illustrating the wireless power supply system of the third embodiment. The main configuration is the same as that of FIG. 10 of the second embodiment, but unlike FIG. 10, a fourth power transmission unit 52 is provided on the power supply floor of the middle floor other than the uppermost and lowermost floors of hoistway 1.

In this example, the case where fourth power transmission unit 52 includes power transmission device 12, two second power transmission coils 14, and third and fourth power transmission coil switching portions 63, 64 will be described.

Fourth power transmission unit 52 includes power transmission device 12, two second power transmission coils 14, and third and fourth power transmission coil switching portions 63, 64.

When second power transmission coil 14 is established in hoistway 1, second power transmission coils 14 connected to the same power transmission device 12 are established so as not to be adjacent to each other.

For example, as illustrated in FIG. 17, in the power supply floor of the middle floor, when fourth power transmission unit 52, first power transmission unit 4, first power transmission unit 4, and fourth power transmission unit 52 are established in order from the upper portion to the lower portion, one of the plurality of second power transmission coils 14 included in fourth power transmission unit 52 is established in the upper portion of the hoistway, and the other is established below the hoistway with first power transmission coil 13 or second power transmission coil 14 included in the other power transmission unit interposed therebetween, so that second power transmission coils 14 connected to the same power transmission device 12 are not adjacent to each other.

Furthermore, only one second power transmission coil 14 connected to the same power transmission device 12 is established in first and second power transmission coils 13, 14 opposite to power reception coil 17 when car 2 stops at the power supply floor.

In addition, when car 2 performs the currently-moving power supply at the power supply floor, third and fourth power transmission coil switching portions 63, 64 are switched between ON and OFF such that only one second power transmission coil 14 that approaches the region where power reception coil 17 can supply the power is connected to power transmission device 12, whereby the currently-moving power supply can be performed without reducing the charging power even in the configuration in which one power transmission device 12 is shared. As the number of second power transmission coils 14 established on the power supply floor increases, the power supply time in the currently-moving power supply becomes longer, and the longer power supply time can be secured.

The establishment places of third and fourth power transmission coil switching portions 63, 64, power transmission device 12, and the power reception unit in the third embodiment are not limited to the positions in FIG. 17, and are not limited thereto as long as the establishment places can exhibit similar functions and effects.

In the third embodiment, control panel 6 and controller 16 are separated, but control panel 6 may include controller 16. Alternatively, control panel 6 may be responsible for the function of controller 16, and only control panel 6 may be used.

Hereinafter, an operation in the third embodiment will be described.

(a) Mode Setting

In control panel 6, the mode setting processing for setting the operation of car 2 on the power supply floor to either the currently-moving power supply mode or the normal operation mode is similar to that described with reference to FIG. 6 in the first embodiment, so that the detailed description thereof will be omitted.

(b) Currently-Moving Power Supply Processing (Entry to Power Supply Floor)

Figure 18:
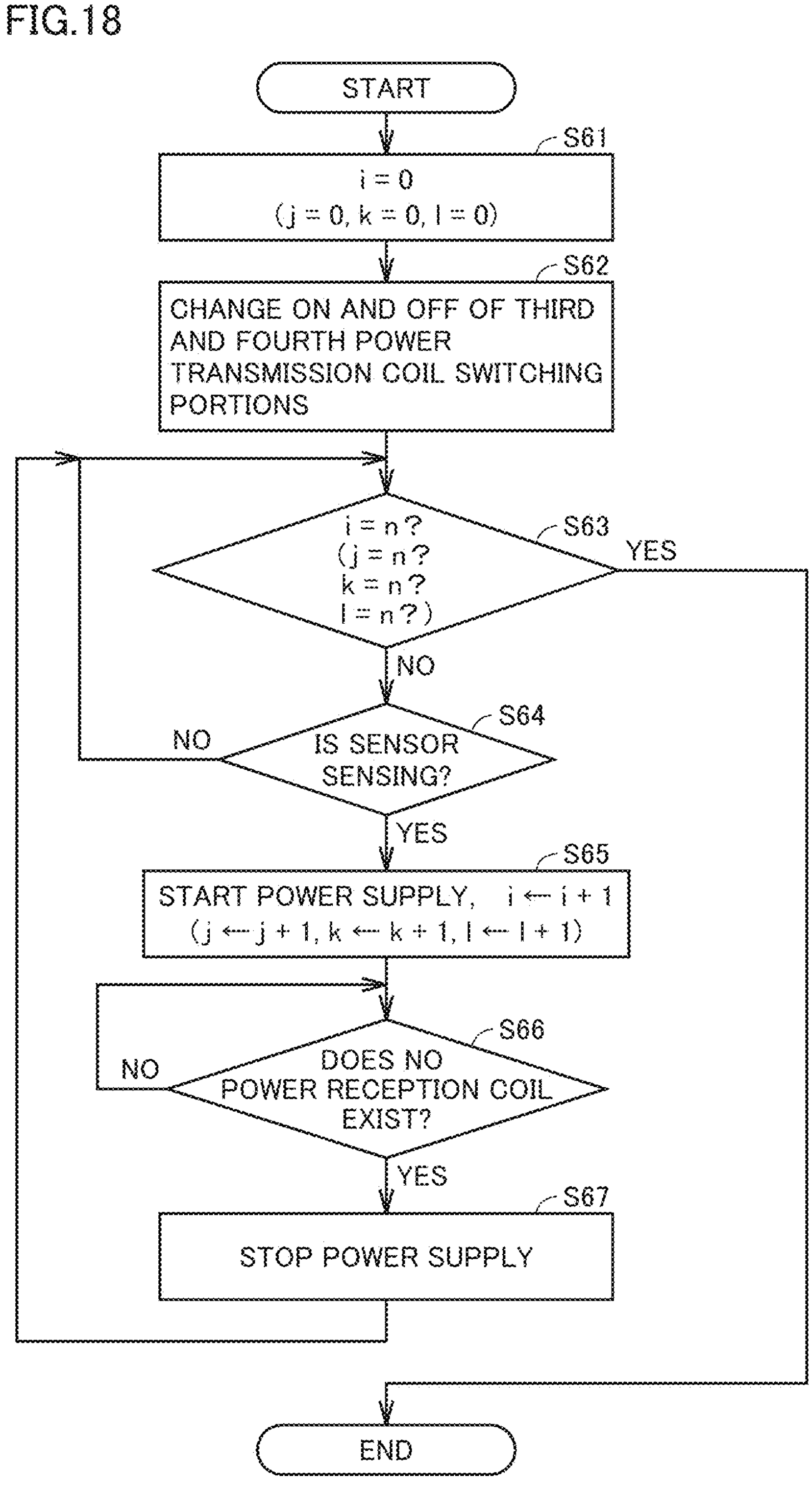
FIG. 18 is a flowchart of a currently-moving power supply processing executed by a controller.

FIG. 18 is a flowchart of the currently-moving power supply processing executed by controller 16. In the currently-moving power supply processing, controller 16 controls first and fourth power transmission units 4, 52.

Because the main configuration is similar to the operation in FIG. 7 of the first embodiment, different operations will be mainly described, and description of similar operations will be omitted.

From the determination in FIG. 6, when car 2 approaches the power supply floor on which the currently-moving power supply is performed, control panel 6 outputs the currently-moving power supply instruction to controller 16 established on the power supply floor.

Similarly to the first and second exemplary embodiments, the coil approach counter is used to count the number of power reception coils 17 in the region where the power can be supplied to second power transmission coil 14. When the currently-moving power supply processing is started, all the coil approach counters are set to an initial value of zero (S61).

In the third embodiment, because there are four second power transmission coils 14, the coil approach counters are set to i, j, k, l in order from the lower portion to the upper portion of the hoistway, and when power reception coil 17 approaches the predetermined region near second power transmission coil 14, the count is incremented by 1.

At this point, whether power reception coil 17 is located in the region opposite to first and second power transmission coils 13, 14 may be determined from, for example, the detection of the position already existing in car 2 or the winding amount of the winding machine, or a position detection circuit may be newly established. The detection result is output to control panel 6, and the output method may be any signal such as the analog signal or the digital signal.

Subsequently, upon receiving the currently-moving power supply instruction, controller 16 turns on a third power transmission coil switching portion 63 and turns off a fourth power transmission coil switching portion 64 so as to connect power transmission device 12 and one second power transmission coil 14 to which power reception coil 17 is approaching (S62).

Thereafter, the currently-moving power supply operation is performed similarly to the first and second embodiments (S63 to S68). When car 2 enters the power supply floor from the lower portion of the hoistway and when second power transmission coil 14 and power reception coil 17 approach the area where the power supply can be performed (YES in S64), coil approach counter i is incremented by 1, and controller 16 drives power transmission device 12 to transmit the power from second power transmission coil 14 to power reception coil 17 in the contactless manner (S65).

When coil approach counter i=n (n is the number of power reception coils 17 established in car 2) (YES in S63), controller 16 ends the currently-moving power supply.

Similarly, coil approach counters j, k, l are also counted up until n is reached. In the example of FIG. 17, lowermost second power transmission coil 14 corresponds to i, second power transmission coil 14 second from the bottom corresponds to j, second power transmission coil 14 third from the bottom corresponds to k, and second power transmission coil 14 fourth from the bottom (uppermost) corresponds to l. In this example, because car 2 enters the power supply floor from the lower portion of the hoistway, the coil approach counter starts counting up in the order of i, j, k, l, and performs the currently-moving power supply in each of second power transmission coils 14.

In the example of FIG. 17, first uppermost power reception coil 17 of car 2 and lowermost second power transmission coil 14 of the power supply floor are opposite to each other (coil approach counter i operates). Third power transmission coil switching portion 63 is turned ON so as to connect second power transmission coil 14 and power transmission device 12 (operation of fourth power transmission unit 52 on the lower side).

Subsequently, uppermost power reception coil 17 of car 2 and second power transmission coil 14 located second from the bottom on the power supply floor are opposite to each other (coil approach counter j operates). Third power transmission coil switching portion 63 is turned ON so as to connect second power transmission coil 14 and power transmission device 12 (operation of upper fourth power transmission unit 52). Because the power supply is performed while car 2 moves upward, two adjacent second power transmission coils 14 are almost simultaneously connected to power transmission device 12.

(c) Currently-Stopping Power Supply Processing

Figure 19:
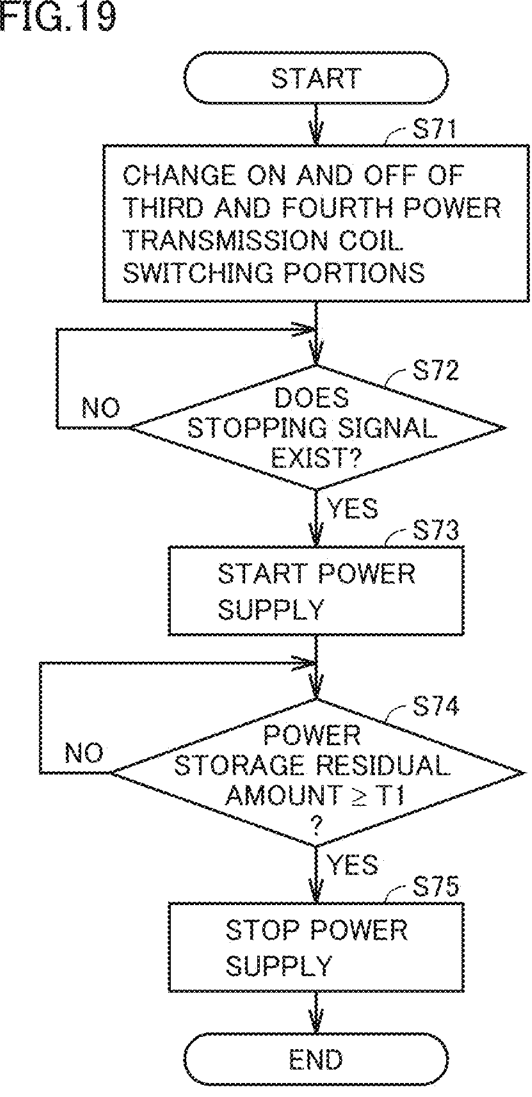
FIG. 19 is a flowchart illustrating currently-stopping power supply processing executed by the controller.

FIG. 19 is a flowchart illustrating the currently-stopping power supply processing executed by controller 16. In the currently-stopping power supply processing, controller 16 controls first and fourth power transmission units 52.

In the third embodiment, the currently-stopping power supply is performed similarly to the first and second embodiments. Because the main configuration is similar to the operation in FIG. 8 of the first and second embodiments, different operations will be mainly described, and description of similar operations will be omitted.

When the currently-stopping power supply processing in FIG. 18 is ended, controller 16 can execute the currently-stopping power supply operation. When the currently-stopping power supply processing is started, third power transmission coil switching portion 63 is turned on and fourth power transmission coil switching portion 64 is turned off such that only first power transmission coil 13 is connected to power transmission device 12, and the operation shifts to the currently-stopping power supply operation (S71).

As described above, when the currently-moving power supply operation is ended, first and second power transmission coil switching portions 61, 62 are turned on and off such that only first power transmission coil 13 is connected to power transmission device 12, whereby one power transmission device 12 is shared and the power supply can be performed while high efficiency is maintained in the currently-stopping power supply without reducing the charging power amount.

Thereafter, controller 16 drives power transmission device 12 to transmit the power from first power transmission coil 13 to power reception coil 17 in the contactless manner (S72 to S75). Because the operation of the currently-stopping power supply is similar to the operation described with reference to FIG. 8 in the first embodiment, the detailed description thereof will be omitted here.

As described above, in the third embodiment, first and fourth power transmission units 4, 52 are provided in the power supply floor, fourth power transmission unit 52 includes the plurality of second power transmission coils 14, power transmission device 12, and the switches of third and fourth power transmission coil switching portions 63, 64, and third power transmission coil switching portion 63 is turned on and fourth power transmission coil switching portion 64 is turned off so as to connect second power transmission coil 14 and power transmission device 12 before car 2 performs the currently-moving power supply in the power supply floor. Therefore, the plurality of second power transmission coils shares one power transmission device 12, but the currently-moving power supply can be performed from second power transmission coil 14 having the shape longer in the traveling direction than first power transmission coil 13 to the power reception coil 17 without reducing the charging power amount, thereby securing the longer power supply time.

In addition, when the currently-stopping power supply is performed, power transmission device 12 of first power transmission unit 4 is driven and the power is transmitted from first power transmission coil 13 to power reception coil 17 in the contactless manner, so that low-efficiency power supply between coils having the low coupling degree can be avoided to maintain high-efficiency power supply between coils having the high coupling degree.

In addition, in the example, the case where the power supply floor exists during the movement to the destination floor has been described, but the present invention is not limited thereto, and the currently-moving power supply may not necessarily be performed when the power supply floor is passed through. For example, measurement portion 10 measures the power storage residual amount of power storage portion 9, and control panel 6 may switch to the currently-moving power supply mode when the power storage residual amount of power storage portion 9 falls below a predetermined threshold T2. Also in this case, the currently-moving power supply may not necessarily be performed when the power supply floor is passed through, and the present invention is not limited thereto.

At this point, similarly to the first and second embodiments, when the power supply floor is the middle floor, it is conceivable that car 2 passes through the power supply floor without stopping at the power supply floor. In this case, controller 16 determines whether to pass through the power supply floor or stop at the power supply floor from the information previously sent from control panel 6. In the case of passing, after the currently-moving power supply is performed, the currently-moving power supply is performed again based on the flowchart operation in FIG. 15.

Similarly to the first and second embodiments, when car 2 passes through the power supply floor, it is conceivable that the plurality of power reception coils 17 established at the uppermost and lowermost positions of car 2 and the plurality of second power transmission coils 14 established at the power supply floor simultaneously approach each other.

In this case, similarly to the currently-moving power supply at the uppermost floor, after whether two power reception coils 17 approach two second power transmission coils 14 is checked, the currently-moving power supply is simultaneously performed by the two power reception coils. On the other hand, when two power reception coils 17 are separated from two second power transmission coils 14 and the region where the power can be supplied, two power reception coils 17 simultaneously stop the currently-moving power supply. In addition, when two second power transmission coils 14 simultaneously charge two power reception coils 17, each of two second power transmission coils 14 is established so as to be included in different fourth power transmission unit 52, and two second power transmission coils 14 are connected to different power transmission devices 12 and supplied with the power. As a result, one power transmission device 12 is configured to be shared, and the currently-moving power supply can be performed without reducing the charging power while the number of power transmission devices 12 is reduced.

In the currently-moving power supply of the first embodiment, the case where the contactless power transmission is performed from only second power transmission coil 14 to power reception coil 17, and the power transmission is performed from only first power transmission coil 13 to power reception coil 17 in the currently-stopping power supply has been described. However, the present invention is not limited to this. For example, in the currently-moving power supply and the currently-stopping power supply, the power supply may be simultaneously performed from first and second power transmission coils 13, 14. Alternatively, the contactless power transmission may be performed from only first power transmission coil 13 to power reception coil 17 in the currently-moving power supply, and the power transmission may be performed from only second power transmission coil 14 to power reception coil 17 in the currently-stopping power supply.

As described above, the power transmission coil that transmits the power to power reception coil 17 may be either first power transmission coil 13 or second power transmission coil 14 regardless of the power supply during the movement and the currently-stopping power supply, and the power may simultaneously be supplied.

Fourth Embodiment

A wireless power supply system according to a fourth embodiment will be described below.

In the wireless power supply system of the fourth embodiment, the hoistway includes hoistway 1 (also referred to as a "first hoistway 1") in which car 2 (also referred to as a "first car 2") moves and a hoistway 21 (also referred to as a "second hoistway 22") that is provided side by side with hoistway 1 and in which a car 22 (also referred to as a "second car 21") moves.

The power supply floor is provided on a common floor between hoistway 1 and hoistway 21. First power transmission coil 13 of hoistway 1 provided at the power supply floor and first power transmission coil 13 of hoistway 21 are connected to common power transmission device 12. Second power transmission coil 14 of hoistway 1 provided at the power supply floor and second power transmission coil 14 of hoistway 21 are connected to common power transmission device 12.

The wireless power supply system includes the switching portion. The switching portion includes a first switching portion and a second switching portion. The first switching portion switches between electric connection of power transmission device 12 and first power transmission coil 13 of hoistway 1 and electrical connection 5 of power transmission device 12 and first power transmission coil 13 of hoistway 21. The second switching portion switches between electrical connection of power transmission device 12 and second power transmission coil 14 of hoistway 1 and electrical connection of power transmission device 12 and second power transmission coil 14 of hoistway 21.

Controller 16 switches the first switching portion according to the operation status of cars 2, 22, and selects whether first power transmission coil 13 that supplies the power from power transmission device 12 is on the side of hoistway 1 or the side of hoistway 21. Controller 16 switches the second switching portion according to the operation status of cars 2, 22, and selects whether second power transmission coil 14 that supplies power from power transmission device 12 is on the side of hoistway 1 or the side of hoistway 21. The first switching portion includes a fifth power transmission coil switching portion 65 and a sixth power transmission coil switching portion 66. The second switching portion includes third power transmission coil switching portion 63 and fourth power transmission coil switching portion 64.

With this configuration, the currently-moving power supply and the currently-stopping power supply can be performed while one power transmission device 12 is shared with respect to load devices 11 of two cars 2, 22 in the adjacent hoistways.

In the fourth embodiment, when either one of cars 2, 22 passes through or stops at the power supply floor, controller 16 switches the first switching portion and the second switching portion so as to supply the power to first power transmission coil 13 and second power transmission coil 14 on the hoistway (hoistway 1, 21) side where the car (cars 2, 22) that passes through or stops at the power supply floor moves.

With such the configuration, even in the configuration in which the power is supplied to load devices 11 of two cars 2, 22 in the adjacent hoistways while one power transmission device 12 is shared, the currently-moving power supply and the currently-stopping power supply can be performed while the power supply efficiency is maintained by switching the switching portion according to the operation status.

In the fourth embodiment, the plurality of first power transmission coils 13 and the plurality of second power transmission coils 14 are provided in one power supply floor. When cars 2, 22 pass through or stop at the same power supply floor, controller 16 switches each of the first switching portion and the second switching portion such that a ratio of supplying the power to first power transmission coil 13 and second power transmission coil 14 on the side of hoistway 1 and a ratio of supplying the power to first power transmission coil 13 and second power transmission coil 14 on the side of hoistway 21 become the same.

For example, when the cars 2, 22 pass through the same power supply floor, one supplies the power to second power transmission coil 14 on the side of hoistway 1, and the other supplies the power to second power transmission coil 14 on the side of hoistway 21. When the cars 2, 22 stop at the same power supply floor, one of them supplies the power to first power transmission coil 13 on the side of hoistway 1, and the other one supplies the power to first power transmission coil 13 on the side of hoistway 21.

With this configuration, even in the configuration in which the power is supplied to the load devices of two cars 2, 22 in the adjacent hoistways while one power transmission device 12 is shared, the currently-moving power supply and the currently-stopping power supply can be performed while the power supply efficiency is maintained by switching the switching portion according to the operation status.

The details will be described below. The wireless power supply system described in the third exemplary embodiment is configured to include hoistway 1, car 2 that moves in hoistway 1, first and fourth power transmission units 52 are established in hoistway 1, and car 2 includes at least one power reception unit 7, power storage portion 9, and load device 11.

On the other hand, the wireless power supply system described in the fourth exemplary embodiment includes two adjacent hoistways and first and second cars 2, 22 that move in the respective hoistways, at least one power reception unit 7, power storage portion 9, and load device 11 are provided in first and second cars 2, 22, fourth and fifth power transmission units 42 are provided between the adjacent hoistways, fifth power transmission unit 42 includes power transmission device 12, two first power transmission coils 13, and fifth and sixth power transmission coil switching portions 65, 66, and fifth and sixth power transmission coil switching portions 65, 66 are switched between ON and OFF such that one of first power transmission coils 13 opposite to power reception coils 17 established in first and second cars 2, 22 is connected to power transmission device 12 when first and second cars 2, 22 enter the power supply floor.

Hereinafter, a wireless power supply system of the fourth embodiment will be described focusing on differences from the wireless power supply system of the third embodiment.

Figure 20:
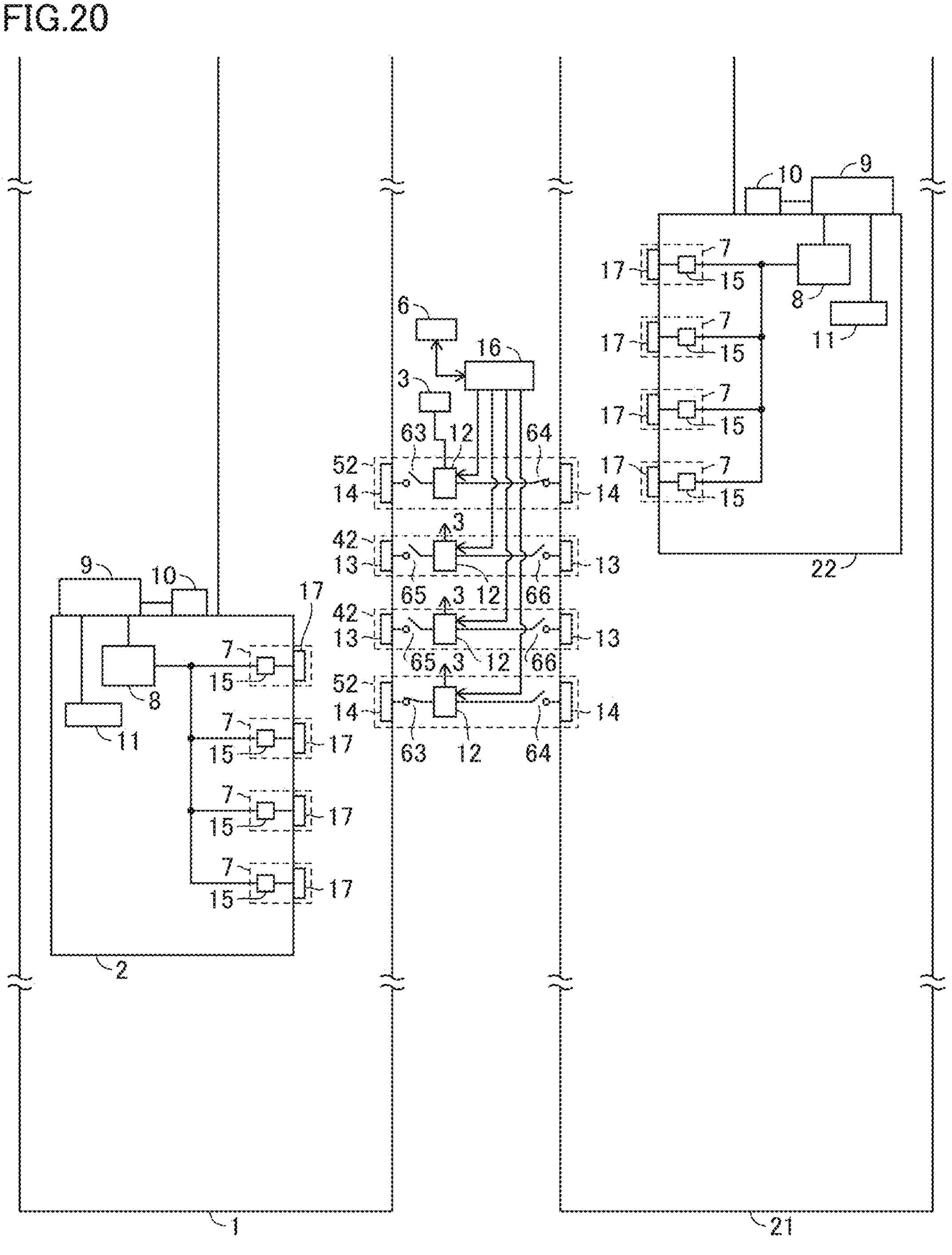
FIG. 20 is a configuration diagram illustrating a wireless power supply system according to a fourth embodiment.
Figure 21:
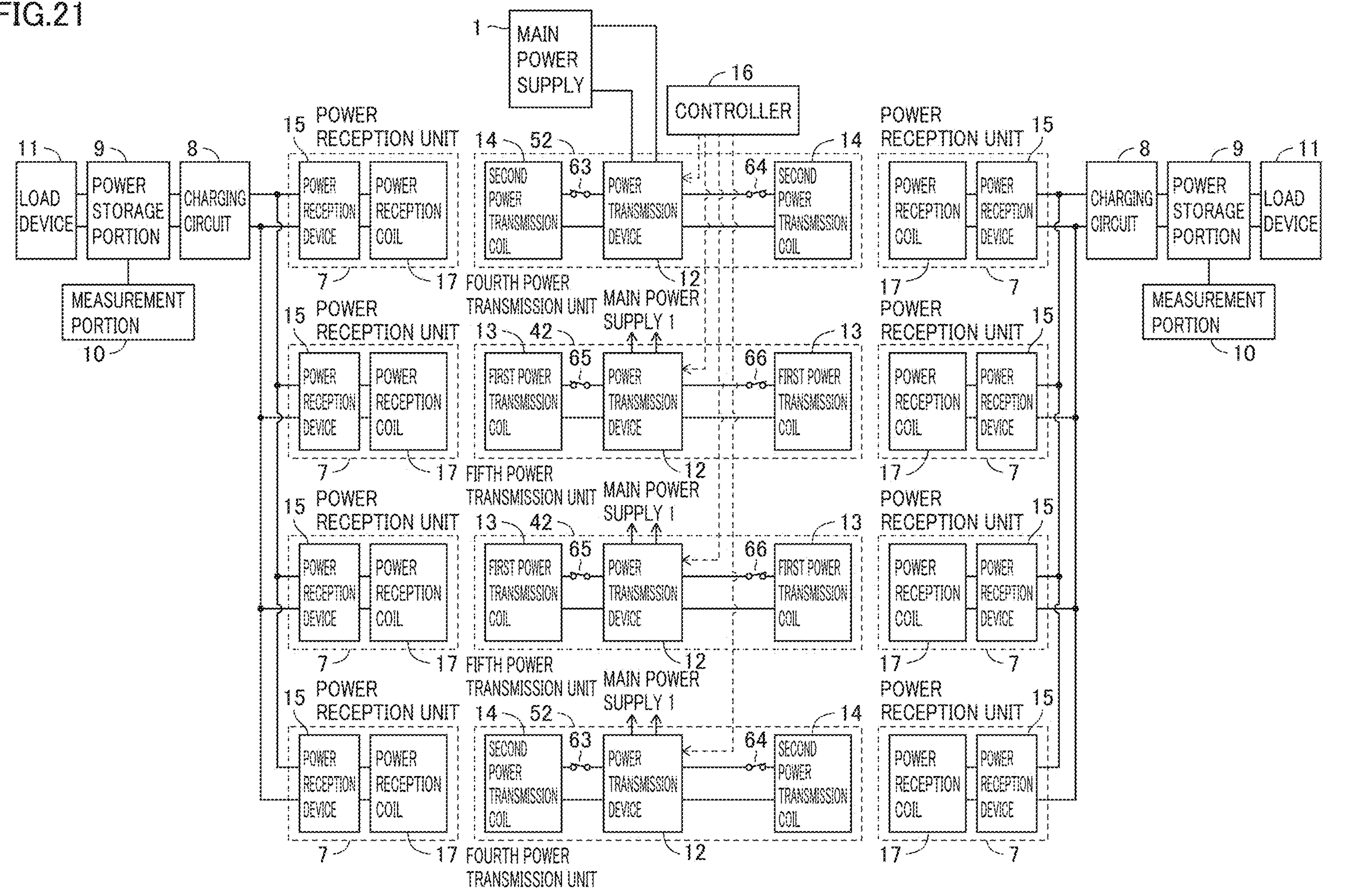
FIG. 21 is a circuit block diagram of a wireless power supply system.

FIG. 20 is a configuration diagram illustrating the wireless power supply system of the fourth embodiment. FIG. 21 is a circuit block diagram of the wireless power supply system. In FIGS. 20 and 21, the same reference numerals are given to the same components.

In the elevator illustrated in FIG. 20, two hoistways 1, 21 adjacent to each other, first car 2 that moves in hoistway 1, a plurality of fourth power transmission units 52 and a plurality of fifth power transmission units 42 that are connected to main power supply 3 and established in the stopping floor of the elevator, controller 16 that controls fourth and fifth power transmission units 52, 42, and control panel 6 that is established in the upper portion of the elevator to control the operation of the elevator are established, and fourth power transmission unit 52 is established in two moving directions of the upper portion and the lower portion of the hoistway than fifth power transmission unit 42, namely, first and second cars 2, 22 that move to the middle floor.

Each of first and second cars 2, 22 includes the plurality of power reception units 7, charging circuit 8, power storage portion 9, measurement portion 10 that measures the consumption amount of power storage portion 9, and load device 11 in each of cars 2, 22.

Fifth power transmission unit 42 includes power transmission device 12, two first power transmission coils 14, and fifth and sixth coil switching portions 65, 66 that connect and disconnect paths between power transmission device 12 and first power transmission coil 13, and each of two first power transmission coils 13 is established on each of the wall surfaces of adjacent hoistways 1, 21.

Similarly to first power transmission coil 13, each of second power transmission coils 14 of fourth power transmission unit 52 is established one by one on the wall surfaces of adjacent hoistways 1, 21.

First and second power transmission coils 13, 14 established on the wall surfaces of hoistways 1, 21 are arranged in one row in the elevating direction. In addition, power reception unit 7 is disposed to be opposite to power transmission units 4, 5 established on the stopping floor, and includes power reception device 15 and power reception coil 17.

First power transmission coil 13 and second power transmission coil 14 are established such that the coupling degree with power reception coil 17 increases when first and second cars 2, 22 stop on the stopping floor.

Specifically, when first and second cars 2, 22 moving in the hoistway approach the power supply floor, third, fourth, fifth, and sixth power transmission coil switching portions 63 to 66 switch between ON and OFF such that at least two first and second power transmission coils 13, 14 are not connected to the power transmission devices 12 included in fourth and fifth power transmission units 52, 42, and power transmission coil switching portions 63 to 66 do not simultaneously supply the power from one power transmission device 12 to the loads in two cars 2, 22 through two power transmission coils 17.

As described above, even in the configuration in which one power transmission device 12 is shared, the currently-moving power supply can be performed to the loads in two cars 2, 22 without reducing the power supply efficiency by switching ON and OFF of third, fourth, fifth, sixth power transmission coil switching portions 63 to 66.

The establishment places of third, fourth, fifth, sixth power transmission coil switching portions 63 to 66, power transmission device 12, and the power reception unit 7 in the fourth embodiment are not limited to the positions in FIG. 20, and are not limited thereto as long as the establishment places can exhibit similar functions and effects.

Although control panel 6 and controller 16 are separated in the second embodiment, control panel 6 may include controller 16. Alternatively, the function of controller 16 may be performed by control panel 6, and only control panel 6 may be used.

Hereinafter, an operation in the fourth embodiment will be described.

[When Only First Car 2 Enters from Lower Floor of Power Supply Floor]

(a) Mode Setting

In control panel 6, the mode setting processing for setting each of the operations of cars 2, 22 on the power supply floor to either the currently-moving power supply mode or the normal operation mode is similar to that described with reference to FIG. 6 in the first embodiment, so that the detailed description thereof will be omitted.

Figure 22:
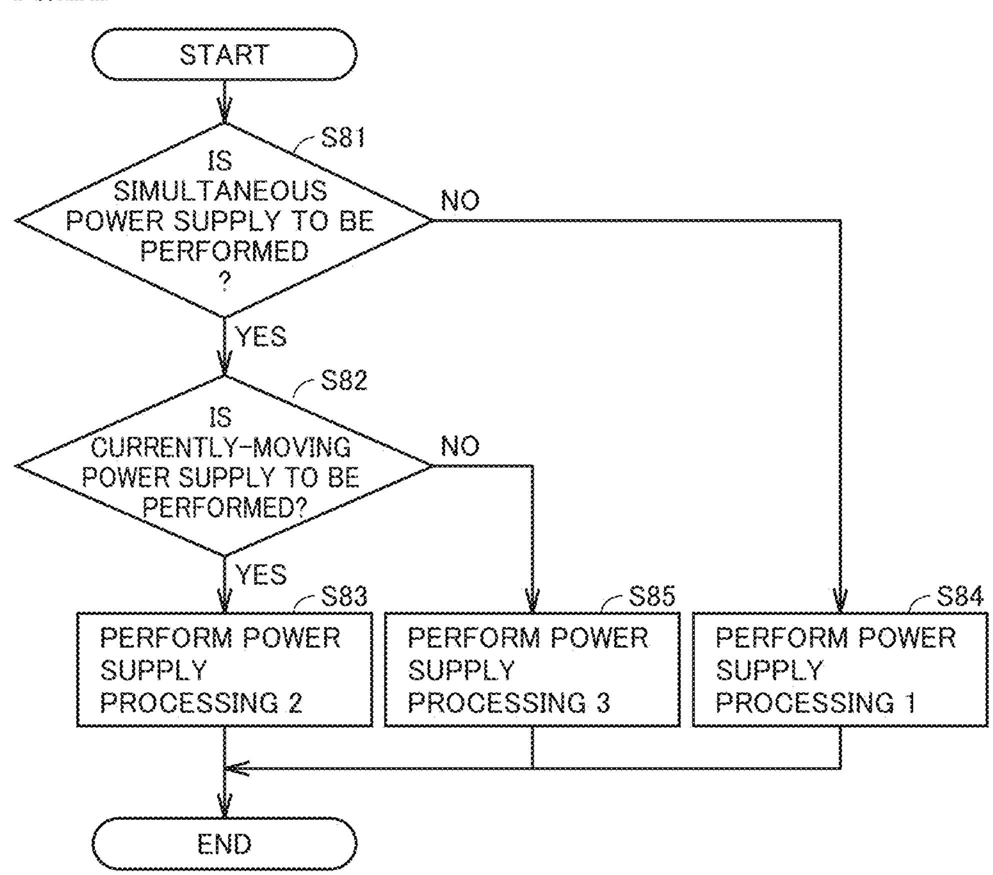
FIG. 22 is a flowchart illustrating operation determination of currently-moving power supply and currently-stopping power supply executed by a controller.

FIG. 22 is a flowchart illustrating operation determination of the currently-moving power supply and the currently-stopping power supply executed by controller 16. Specifically, the processing is executed when one or both of first and second cars 2, 22 perform the currently-moving power supply or the currently-stopping power supply at a certain power supply floor.

In S81, control panel 6 determines whether both first and second cars 2, 22 perform the currently-moving power supply or currently-stopping power supply (whether to perform the simultaneous power supply). When it is determined that both first and second cars 2, 22 perform the currently-moving power supply or the currently-stopping power supply (YES in S81), the processing proceeds to S82. When it is determined that both first and second cars 2, 22 does not perform the currently-moving power supply or the currently-stopping power supply (NO in S81), the processing proceeds to S84.

When it is determined that both first and second cars 2, 22 does not perform the currently-moving power supply or the currently-stopping power supply namely, when it is determined that either one of first and second cars 2, 22 performs the currently-moving power supply or the currently-stopping power supply, power supply processing 1 is performed in S84, and the processing ends.

In S82, control panel 6 determines whether to perform the currently-moving power supply. When it is determined that the currently-moving power supply is performed (YES in S82), the processing proceeds to S83, power supply processing 2 is performed, and the processing ends. When it is determined that the currently-moving power supply is not performed (NO in S82), the processing proceeds to S85, power supply processing 3 is performed, and the processing ends.

(b) Currently-Moving Power Supply Processing

Figure 23:
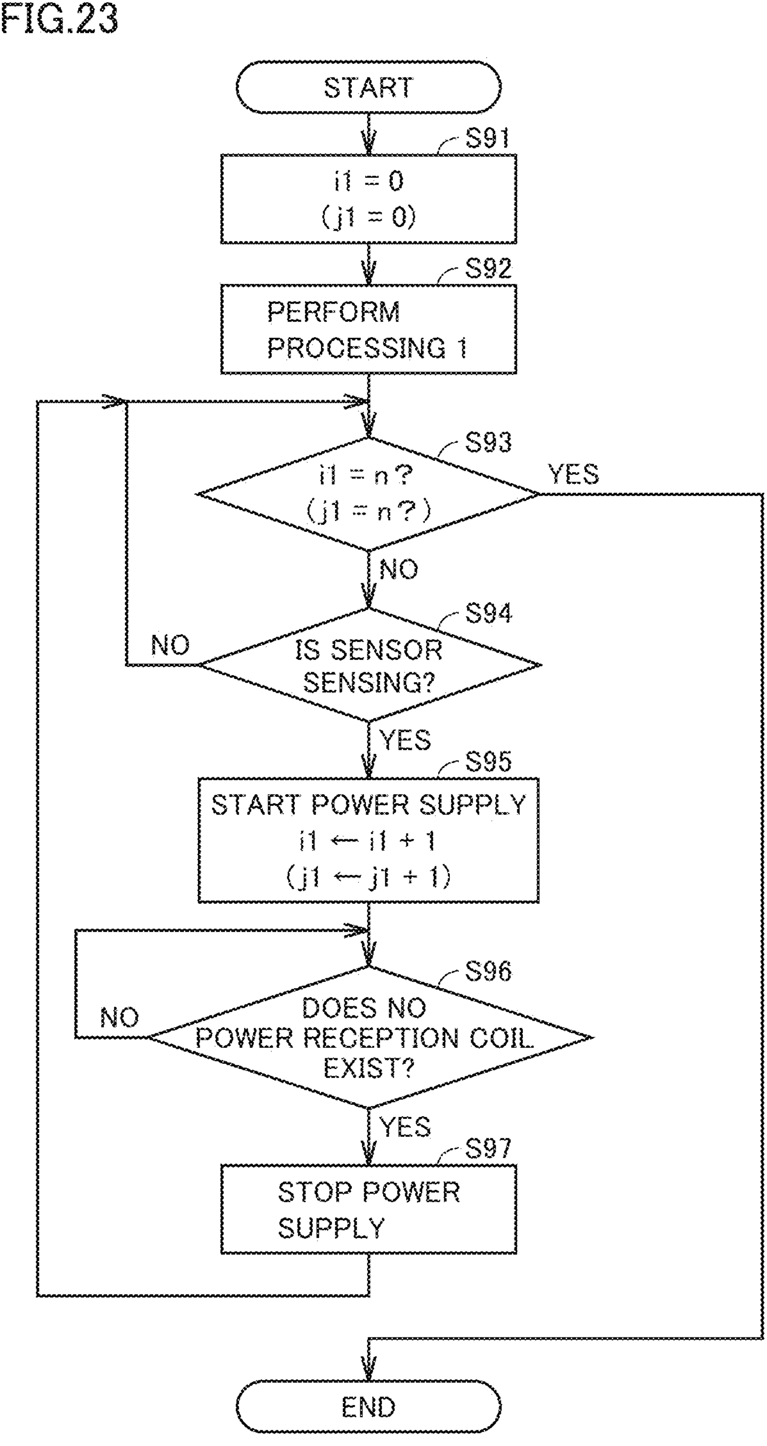
FIG. 23 is a flowchart illustrating a currently-moving power supply processing executed by the controller.

FIG. 23 is a flowchart illustrating the currently-moving power supply processing executed by controller 16. Here, power supply processing 1 is executed as the currently-moving power supply processing, and controller 16 controls fourth power transmission unit 52. At this point, description will be given by exemplifying the case where the power is supplied to the power supply floor other than the uppermost and lowermost floors while only first car 2 enters from the lower floor. Power supply processing 1 may be set or changed according to the operation status, and is not limited to the previously setting like the fourth embodiment.

controller 16 performs processing 1 when only first car 2 performs the currently-moving power supply at the power supply floor. In processing 1, third power transmission coil switching portion 63 is turned on and fourth power transmission coil switching portion 64 is turned off such that only second power transmission coil 14 established in hoistway 1 is connected to power transmission device 12. Further, fifth and sixth power transmission coil switching portions 65, 66 of fifth power transmission unit 42 are also turned off.

i1 and j1 are coil approach counters, and an initial value is set to zero (S91). i1 increases when power reception coil 17 approaches second power transmission coil 14 established in the lower portion of hoistway 1, and j1 increases when power reception coil 17 approaches second power transmission coil 14 established in the upper portion of hoistway 1. Similarly, i2 increases when power reception coil 17 approaches second power transmission coil 14 established in the lower portion of hoistway 21, and j2 increases when power reception coil 17 approaches second power transmission coil 14 established in the upper portion of hoistway 21. When the currently-moving power supply is performed only to first car 2, only coil approach counters i1, j1 are used.

n is the number of power reception coils 17 established in car 2, and is a value determined when the elevator is established. In the fourth embodiment, n=4.

Thereafter, similarly to the first embodiment, when power reception coil 17 established in first car 2 approaches the region where the power supply can be performed to second power transmission coil 14, power transmission device 12 is driven, and the power is transmitted from second power transmission coil 14 to power reception coil 17 (S94 to S97).

When coil approach counter i1=n (n is the number of power reception coils 17 established in car 2) (YES in S93), controller 16 ends the currently-moving power supply.

As described above, by switching ON and OFF of the third and fourth power transmission coil switching portions 63, 64 so as to perform the power supply only to power reception coil 17 established in car 2 approaching the power supply floor, the high-efficiency power supply can be maintained even in the configuration in which one power transmission device 12 is shared by a plurality of power transmission coils.

(c) Currently-Stopping Power Supply Processing

Figure 24:
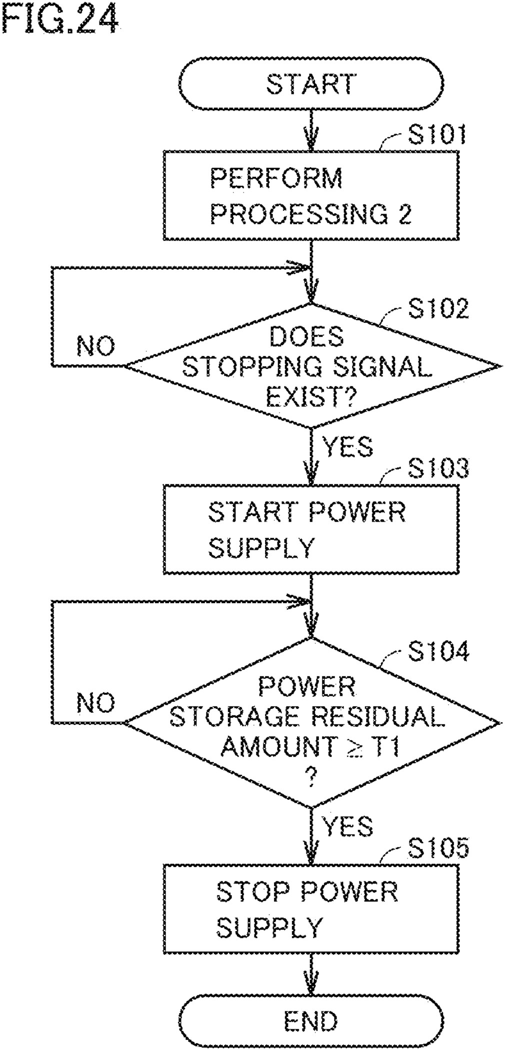
FIG. 24 is a flowchart illustrating currently-stopping power supply processing executed by the controller.

FIG. 24 is a flowchart illustrating the currently-stopping power supply processing executed by controller 16. In the currently-stopping power supply processing, controller 16 controls fourth and fifth power transmission units 52, 42. Because the main configuration is similar to the operation of the first embodiment, different operations will be mainly described, and description of similar operations will be omitted.

When the currently-moving power supply processing in FIG. 23 is ended, the currently-stopping power supply processing can be executed. When the currently-stopping power supply processing is started, controller 16 first performs processing 2 (S101). In processing 2, fifth power transmission coil switching portion 65 is turned on and sixth power transmission coil switching portion 66 is turned off such that only first power transmission coil 13 established in hoistway 1 is connected to power transmission device 12, and the currently-stopping power supply processing is executed. Further, third and fourth power transmission coil switching portions 63, 64 are also turned off.

As described above, in the currently-stopping power supply processing, fifth and sixth power transmission coil switching portions 65, 66 are turned on and off such that only first power transmission coil 13, which is established in hoistway 1 and is opposite to power reception coil 17 of car 2 stopped at the power supply floor, is connected to power transmission device 12, so that one power transmission device 12 is shared and the power supply can be performed while the high efficiency is maintained in the currently-stopping power supply.

Thereafter, controller 16 drives power transmission device 12 of fifth power transmission unit 42, and transmits the power from first power transmission coil 13 to power reception coil 17 in the contactless manner. Because the operation of the currently-stopping power supply is similar to the operation described with reference to FIG. 8 in the first embodiment, the detailed description thereof will be omitted here.

It is conceivable that car 2 passes through without stopping at the power supply floor. In this case, currently-moving power supply is performed again based on the flowchart operation in FIG. 23 after currently-moving power supply is performed.

In addition, when car 2 passes through the power supply floor, it is conceivable that two power reception coils 17 established at the uppermost and lowermost positions of car 2 and two second power transmission coils 14 established at the power supply floor simultaneously approach each other.

In this case, similarly to the currently-moving power supply at the uppermost floor, after whether two power reception coils 17 approach two second power transmission coils 14 is checked, the currently-moving power supply is simultaneously performed by the two power reception coils. On the other hand, when two power reception coils 17 are separated from two second power transmission coils 14 and the region where the power can be supplied, two power reception coils 17 simultaneously stop the currently-moving power supply.

In the fourth embodiment, the case where first car 2 moving in hoistway 1 performs the currently-moving power supply and the currently-stopping power supply at the power supply floor has been described, but when second car 22 moving in hoistway 21 performs the currently-moving power supply and the currently-stopping power supply at the power supply floor, third, fourth, fifth, and sixth power transmission coil switching portions 63 to 66 are turned on and off such that power transmission devices 12 of fourth and fifth power transmission units 42 are connected to first and second power transmission coils 13, 14 established in hoistway 22 in processing 1 and processing 2.

As illustrated in FIG. 22, when it is determined that the currently-moving power supply is simultaneously performed to two cars 2, 22 (YES in S**8*l*), it is determined whether the currently-moving power supply is performed (S82). According to the determination, power supply processing 2 (S83) is executed when the currently-moving power supply is performed, and power supply processing 3 (S83**) is executed when the currently-stopping power supply is performed.

Power supply processing 2 will be described first. An example, in which first car 2 enters the power supply floor from the upper floor and second car 22 simultaneously enters the power supply floor from the lower floor, will be described in the fourth embodiment.

[When First Car 2 Enters Power Supply Floor from Upper Floor and Second Car 22 Simultaneously Enters Power Supply Floor from Lower Floor]

(b) Currently-Moving Power Supply Processing

In power supply processing 2 of FIG. 22, one fourth power transmission unit 52 of two fourth power transmission units 52 is previously set to the power supply to only one car. The case where fourth power transmission unit 52 and fifth power transmission unit 42 in the upper portion perform the currently-moving power supply and the currently-stopping power supply to first car 2 moving in hoistway 1 and fourth power transmission unit 52 and fifth power transmission unit 42 in the lower portion perform the currently-moving power supply and the currently-stopping power supply to second car 22 moving in hoistway 21 will be described as an example in the fourth embodiment. Power supply processing 2 may be set or changed according to the operation status, and is not limited to the previously setting as in the fourth embodiment.

As described above, in power supply processing 2, one fourth power transmission unit 52 out of two fourth power transmission units 52 is previously set to perform the power supply to only one car, and the power supply from one power transmission device 12 to the plurality of power reception coils 17 is prevented from being simultaneously performed, so that the power supply can be simultaneously performed without degrading the power supply efficiency even in the configuration in which one power transmission device 12 is shared.

When the currently-moving power supply or the currently-stopping power supply is simultaneously performed to two cars 2, 22 on one power supply floor, controller 16 controls fourth and fifth power supply units allocated in power supply processing 2 for each hoistway.

Figure 25:
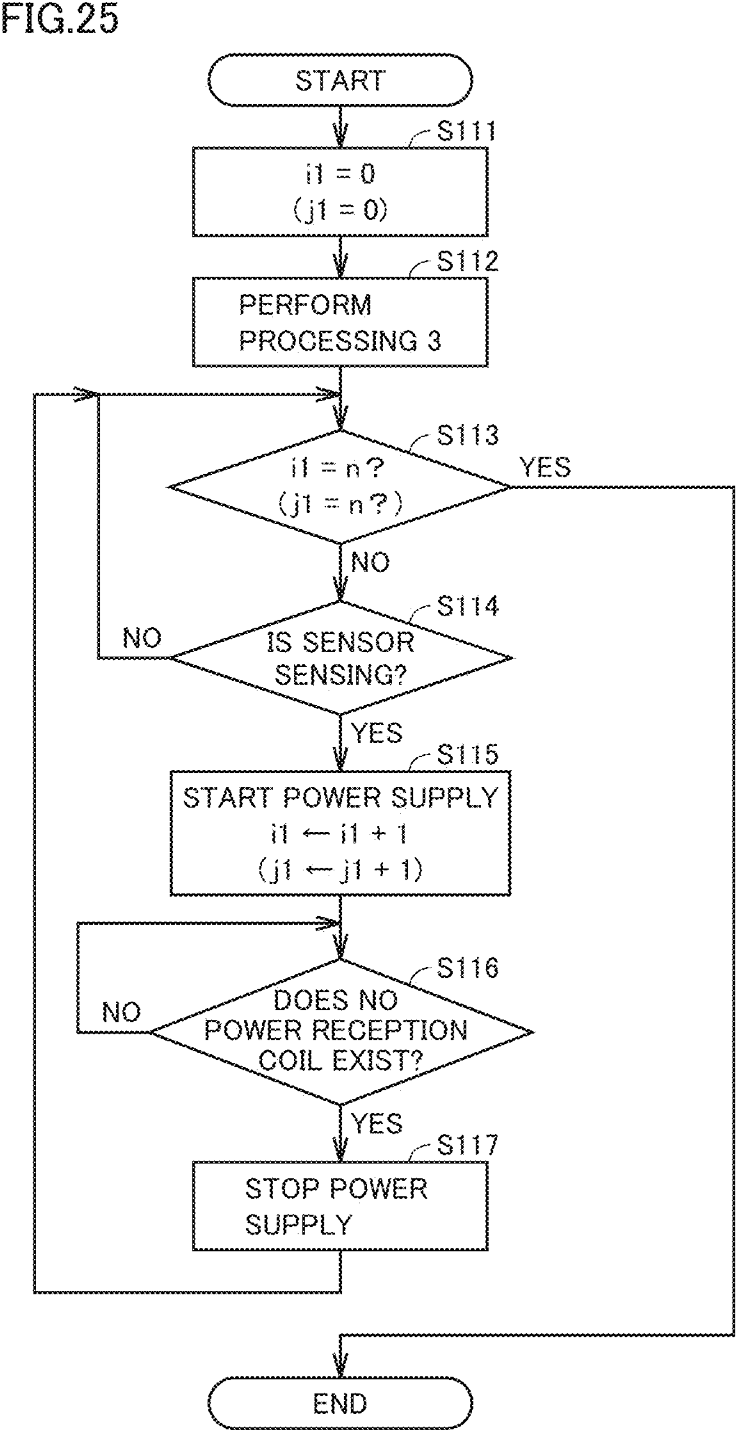
FIG. 25 is a flowchart illustrating the currently-moving power supply processing for a first car executed by the controller.

FIG. 25 is a flowchart illustrating the currently-moving power supply processing for first car 2 executed by controller 16. Controller 16 controls fourth power transmission unit 52 in the upper portion when the currently-moving power supply is performed to first car 2 on the power supply floor.

The coil approach counter sets initial values of i1 and j1 to zero (S111). i1 increases when power reception coil 17 approaches second power transmission coil 14 established in the lower portion of hoistway 1, and j1 increases when power reception coil 17 approaches second power transmission coil 14 established in the upper portion of hoistway 1.

Subsequently, processing 3 is executed (S112). In processing 3, third power transmission coil switching portion 63 is turned on, fourth power transmission coil switching portion 64 is turned off, and fifth and sixth power transmission coil switching portions 65, 66 of fifth power transmission unit 42 established in the upper portion are turned off such that power transmission device 12 of fourth power transmission unit 52 established in the upper portion and second power transmission coil 14 established in hoistway 1 are connected.

Thereafter, similarly to the first embodiment, when power reception coil 17 established in first car 2 approaches the region where the power can be supplied to second power transmission coil 14, controller 16 drives power transmission device 12, and transmits the power from second power transmission coil 14 to power reception coil 17 (S115 and the like).

When coil approach counter j1=n (n is the number of power reception coils 17 established in first and second cars 2, 22.) holds (YES in S113), controller 16 ends the currently-moving power supply. Similarly, second car 22 also performs the currently-moving power supply.

Figure 26:
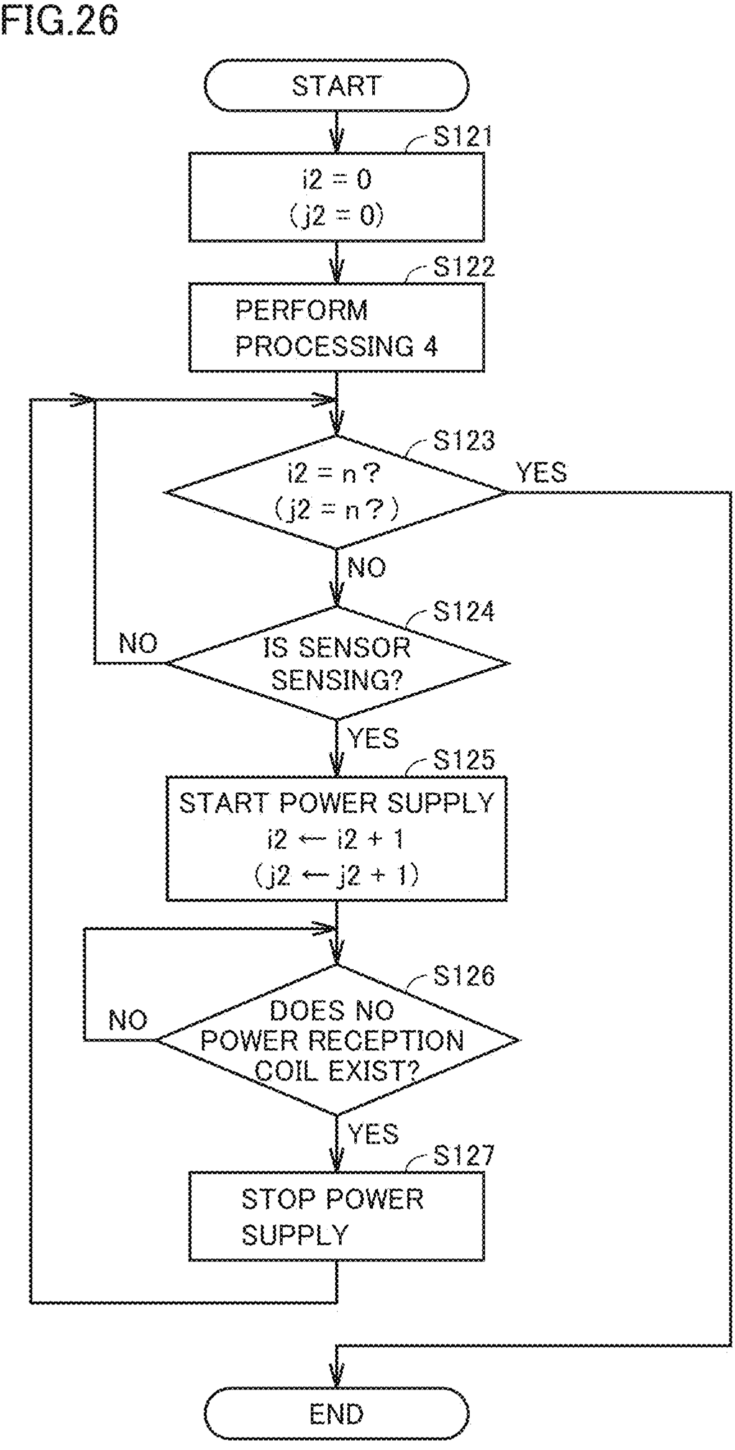
FIG. 26 is a flowchart illustrating the currently-moving power supply processing for a second car executed by the controller.

FIG. 26 is a flowchart illustrating the currently-moving power supply processing for second car 22 executed by controller 16. Controller 16 controls upper fourth power transmission unit 52 when performing the currently-moving power supply to second car 22 at the power supply floor.

The coil approach counter sets initial values of i2 and j2 to zero (S121). i2 increases when power reception coil 17 approaches second power transmission coil 14 established in the lower portion of hoistway 1, and i2 increases when power reception coil 17 approaches second power transmission coil 14 established in the upper portion of hoistway 1.

Subsequently, processing 4 is executed (S122). In processing 4, third power transmission coil switching portion 63 is turned on, fourth power transmission coil switching portion 64 is turned off, and fifth and sixth power transmission coil switching portions 65, 66 of fifth power transmission unit 42 established in the lower portion are turned off such that power transmission device 12 of fourth power transmission unit 52 established in the upper portion and second power transmission coil 14 established in hoistway 1 are connected.

Hereinafter, because the currently-moving power supply is performed in the same manner as in first car 2, detailed description thereof will be omitted.

As described above, in the case where the currently-moving power supply is simultaneously performed to two cars 2, 22 moving in the adjacent left and right hoistways in one power supply floor, the cars to which the power is transmitted are divided for each of fourth power transmission units 52, and power transmission device 12 switches third and fourth power transmission coil switching portions 63, 64 so as to be connected to only one second power transmission coil 14, whereby the decrease in power supply efficiency can be prevented even in the configuration in which one power transmission device 12 is shared by the plurality of second power transmission coils 14 during the currently-moving power supply.

In the fourth embodiment, in two fourth power transmission units 52 established in the power supply floor, fourth power transmission unit 52 established in the upper portion transmits the power to power reception coil 17 established in first car 2 moving in hoistway 1 through second power transmission coil 14, and fourth power transmission unit 52 established in the lower portion transmits the power to power reception coil 17 established in second car 22 moving in hoistway 21 through second power transmission coil 14. However, the manner of separating fourth power transmission unit 52 that transmits the power to power reception coil 17 of each of first and second cars 2, 22 is not limited. For example, fourth power transmission unit 52 established in the upper portion may transmit the power to power reception coil 17 of second car 22, and fourth power transmission unit 52 established in the lower portion may transmit the power to power reception coil 17 of first car 2. Therefore, which of upper and lower fourth power transmission units 52 transmits the power to power reception coils 17 of left and right first and second cars 2, 22 is not limited.

(c) Currently-Stopping Power Supply Processing

Power supply processing 3 will be described below.

In power supply processing 3, one fifth power transmission unit 42 out of two fifth power transmission units 42 is previously set to perform the power supply to only one car (car 2 or car 22). The case, in which fifth power transmission unit 42 in the upper portion performs the currently-stopping power supply to first car 2 moving in hoistway 1 and fifth power transmission unit 42 in the lower portion performs the currently-stopping power supply to second car 22 moving in hoistway 21, will be described in the fourth embodiment. Power supply processing 3 may be set according to the operation status or the setting may be changed, and power supply processing 3 is not limited to being previously set.

When the currently-stopping power supply is simultaneously performed to two cars 2, 22 at one power supply floor, controller 16 controls the fifth power supply unit allocated in power supply processing 3 for each hoistway.

As described above, in power supply processing 3, one fifth power transmission unit 42 in two fifth power transmission units 42 is previously set to perform the power supply to only one car, and the power supply from one power transmission device 12 to the plurality of power reception coils 17 is prevented from being simultaneously performed, so that the previously-stopping power supply can be simultaneously performed to two cars 2, 22 moving in the adjacent left and right hoistways 1, 21 without decreasing the power supply efficiency even in the configuration in which one power transmission device 12 is shared.

Figure 27:
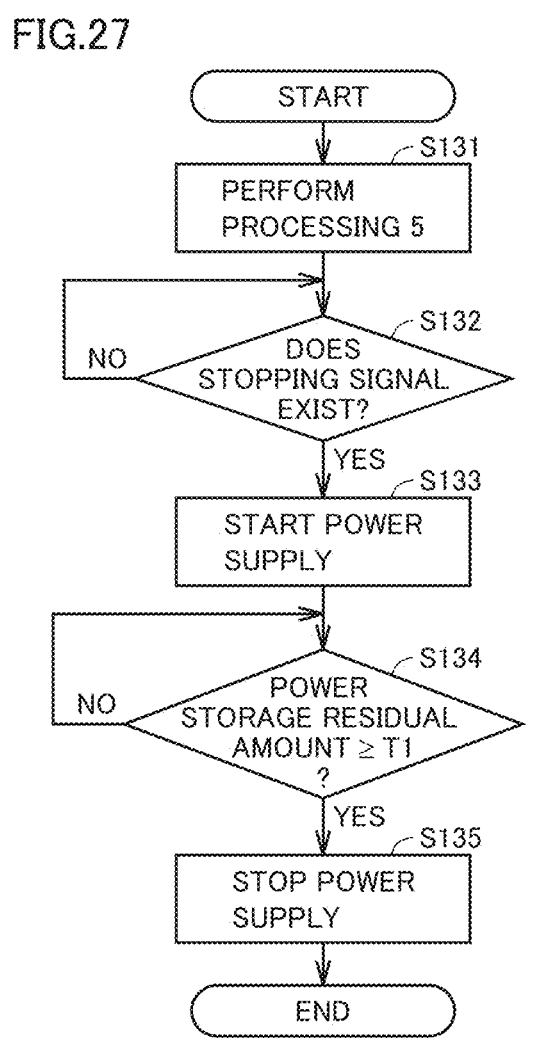

FIG. 27 is a flowchart illustrating the currently-stopping power supply processing for first car 2 executed by controller 16. Fifth power transmission unit 42 is controlled when currently-stopping power supply to first car 2 is performed at the power supply floor. Because the main configuration is similar to the operation of the first embodiment, different operations will be mainly described, and description of similar operations will be omitted.

First, processing 5 (S131) is executed. In processing 5, fifth power transmission coil switching portion 65 is turned on, sixth power transmission coil switching portion 66 is turned off, and third and fourth power transmission coil switching portions 63, 64 included in fourth power transmission unit 52 established in the upper portion are turned off such that power transmission device 12 of fifth power transmission unit 42 established in the upper portion and first power transmission coil 13 established in hoistway 1 are connected to each other.

Thereafter, controller 16 drives power transmission device 12 of fifth power transmission unit 42, and transmits the power from first power transmission coil 13 to power reception coil 17 in the contactless manner (S132 to S135). Because the operation of the currently-stopping power supply is similar to the operation described with reference to FIG. 8 in the first embodiment, the detailed description thereof will be omitted here.

Similarly, FIG. 28 is a flowchart illustrating the currently-stopping power supply processing to second car 22 executed by controller 16. Controller 16 controls fourth and fifth power transmission units 42 when performing the currently-stopping power supply to power reception coil 17 of second car 22.

First, processing 6 (S141) is executed. In processing 6, fifth power transmission coil switching portion 65 is turned off, sixth power transmission coil switching portion 66 is turned on, and third and fourth power transmission coil switching portions 63, 64 included in fourth power transmission unit 52 established in the upper portion are turned off such that power transmission device 12 of fifth power transmission unit 42 established in the lower portion and first power transmission coil 13 established in hoistway 21 are connected to each other.

Thereafter, controller 16 drives power transmission device 12 of fifth power transmission unit 42, and transmits the power from first power transmission coil 13 to power reception coil 17 in the contactless manner (S142 to S145). Because the operation of the currently-stopping power supply is similar to the operation described with reference to FIG. 8 in the first embodiment, the detailed description thereof will be omitted here. In the case where the currently-stopping power supply is supplied to two cars 2, 22 at one power supply floor, the same procedure as described above is performed.

As described above, the on and off of fifth and sixth power transmission coil switching portions 65, 66 is switched such that the power is transmitted from one fifth power supply unit 42 to each of cars 2, 22 moving in the adjacent hoistways, so that the currently-moving power supply can be simultaneously performed to two cars 2, 22 at one power supply floor without degrading the power supply efficiency even in the configuration in which one power transmission device 12 is shared by two first power transmission coils 13.

As described above, the power is set to be transmitted from one of fourth and fifth power supply units 52, 42 to each of cars 2, 22 moving in the adjacent hoistways, and third, fourth, fifth, and sixth power transmission coil switching portions 63 to 66 are switched between on and off, so that the currently-moving power supply can be simultaneously performed to two cars 2, 22 on one power supply floor without lowering the power supply efficiency even in the configuration in which two hoistways 1, 21 are adjacent to each other and one power transmission device 12 is shared by two second power transmission coils 17.

The case, in which the contactless power transmission is performed from only second power transmission coil 14 to power reception coil 17 in the currently-moving power supply and the power transmission is performed from only first power transmission coil 13 to power reception coil 17 in the currently-stopping power supply, has been described in the fourth embodiment. However, the present invention is not limited thereto. For example, in the currently-moving power supply and the currently-stopping power supply, the power supply may be simultaneously performed from both first and second power transmission coils 13, 14. Alternatively, the contactless power transmission may be performed from only first power transmission coil 13 to power reception coil 17 in the currently-moving power supply, and the power transmission may be performed from only second power transmission coil 14 to power reception coil 17 in the currently-stopping power supply. At that time, when the power supply is simultaneously performed to two cars 2, 22 moving in adjacent hoistways 1, 21, which of first car 2 and second car 22 the power is previously transmitted to is specified and determined for each of the plurality of fourth and fifth power transmission units 52, 42.

As described above, the power transmission coil that transmits the power to power reception coil 17 may be either first power transmission coil 13 or second power transmission coil 14 regardless of the power supply during the movement and the currently-stopping power supply, and the power may simultaneously be supplied.

In the example, the case where the currently-moving power supply is performed at all the power supply floors during movement to the destination floor has been described. However, the present invention is not limited thereto. For example, when car 2 or car 22 performs the currently-moving power supply on the power supply floor and the power storage residual amount of power storage portion 9 becomes greater than or equal to a predetermined threshold, control panel 6 may switch to the normal operation mode and may not perform the currently-moving power supply on the power supply floor passing between car 2 and the destination floor.

Alternatively, the power supply floors on which the currently-moving power supply is performed may be divided according to the time period, and only the power supply floor during the movement to the destination floor may perform the currently-moving power supply to car 2 or car 22.

In the wireless power supply system of the first to fourth embodiments described above, when car 2 (or car 22) stops at the power supply floor, power reception coil 17 may be opposite to only first power transmission coil 13, and power reception coil 17 may not be opposite to second power transmission coil 14.

In addition, first power transmission coil 13 and second power transmission coil 14 are not limited to be established at the same power supply floor, but first power transmission coil 13 may be established at a certain power supply floor, and second power transmission coil 14 may be established at a power supply floor different from the power supply floor.

The embodiments disclosed herein are also planned to be implemented in appropriate combination within a range not contradictory. It should be considered that the disclosed embodiment is an example in all respects and not restrictive. The technical scope of the present disclosure is defined by not the description above, but the claims, and it is intended that all modifications within the meaning and scope of the claims are included in the present invention.

REFERENCE SIGNS LIST

1: hoistway, 2: car, 3: main power supply, 4: first power transmission unit, 5: second power transmission unit, 6: control panel, 7: power reception unit, 8: charging circuit, 9: power storage portion, 10: measurement portion, 11: load device, 12: power transmission device, 13: first power transmission coil, 14: second power transmission coil, 15: power reception device, 16: controller, 17: power reception coil, 21: hoistway, 22: second car, 42: fifth power transmission unit, 51: third power transmission unit, 52: fourth power transmission unit, 61: first power transmission coil switching portion, 62: second power transmission coil switching portion, 63: third power transmission coil switching portion, 64: fourth power transmission coil switching portion, 65: fifth power transmission coil switching portion, 66: sixth power transmission coil switching portion

The invention claimed is:

1. A wireless power supply system that supplies power on a power supply floor, in a contactless manner, to a car moving in a hoistway of an elevator, the wireless power supply system comprising:

a power transmission unit that is provided on a side of the hoistway to supply the power in the contactless manner;

a power reception unit that is provided on a side of the car to receive the power, in the contactless manner, supplied from the power transmission unit;

a controller to control the power transmission unit and the power reception unit; and a power storage to store the power received by the power reception unit and supply the power to a load provided in the car, wherein the power transmission unit includes a plurality of power transmission coils provided along the hoistway and at least one power transmitter that supplies the power to each of the plurality of power transmission coils, the power reception unit includes a plurality of power reception coils provided on a surface of the car opposite to the power transmission coil and at least one power receiver that receives the power from each of the power reception coils, the plurality of power transmission coils include at least a first power transmission coil and a second power transmission coil, and a length of the second power transmission coil in a traveling direction of the car is longer than a length of the first power transmission coil.

2. The wireless power supply system according to claim 1, wherein the second power transmission coil is provided on a side closer to a direction in which the car enters the power supply floor than the first power transmission coil is.

3. The wireless power supply system according to claim 1, wherein the controller causes the power transmitter to supply the power to the second power transmission coil when the power is stored in the power storage while the car is moving on the power supply floor; and the controller causes the power transmitter to supply the power to the first power transmission coil when the power is stored in the power storage while the car is stopped at the power supply floor.

4. The wireless power supply system according to claim 1, wherein a coupling degree when the first power transmission coil is opposite to the power reception coil is larger than a coupling degree when the second power transmission coil is opposite to the power reception coil.

5. The wireless power supply system according to claim 1, wherein the controller causes the power transmitter to supply the power to the second power transmission coil when determining whether to cause the power storage to store the power when passing through the power supply floor in accordance with a power storage residual amount of the power storage or an operation status of the car.

6. The wireless power supply system according to claim 1, wherein when the car causes the power storage to store the power at the power supply floor and when a power storage residual amount of the power storage is less than or equal to a predetermined threshold, the controller causes the power transmitter to supply the power to the first power transmission coil and causes the power transmitter to supply the power to the second power transmission coil.

7. The wireless power supply system according to claim 4, wherein the power transmission unit further includes a switch to switch between a first connection and a second connection, the first connection being an electric connection between the power transmitter and the first power transmission coil, the second connection being an electric connection between the power transmitter and the second power transmission coil, and the controller switches the switch and controls whether to supply the power from the power transmitter to the first power transmission coil or to the second power transmission coil.

8. The wireless power supply system according to claim 3, wherein a plurality of the second power transmission coils are provided along the hoistway on the power supply floor, the power transmission unit further includes a switch to switch whether to electrically connect the power transmitter and any one of the plurality of second power transmission coils, and the controller switches the switch in accordance with the traveling direction of the car, and selects the second power transmission coil that supplies the power from the power transmitter.

9. The wireless power supply system according to claim 3, wherein the hoistway includes a first hoistway in which a first car moves and a second hoistway provided side by side with the first hoistway and in which a second car moves, the power supply floor is provided on a common floor in the first hoistway and the second hoistway, the first power transmission coil of the first hoistway and the first power transmission coil of the second hoistway that are provided in the power supply floor are connected to the common power transmitter, and the second power transmission coil of the first hoistway and the second power transmission coil of the second hoistway that are provided in the power supply floor are connected to the common power transmitter.

10. The wireless power supply system according to claim 9, further comprising:

a first switch to switch between a first connection and a second connection, the first connection being an electric connection between the power transmitter and the first power transmission coil of the first hoistway, the second connection being an electric connection between the power transmitter and the first power transmission coil of the second hoistway; and a second switch to switch between electric connection between the power transmitter and the second power transmission coil of the first hoistway and electric connection between the power transmitter and the second power transmission coil of the second hoistway, wherein the controller switches the first switch in accordance with an operation status of the car, and selects whether the first power transmission coil that supplies the power from the power transmitter is on the first hoistway side or the second hoistway side, and the controller switches the second switch in accordance with an operation status of the car, and selects whether the second power transmission coil that supplies the power from the power transmitter is on the first hoistway side or the second hoistway side.

11. The wireless power supply system according to claim 10, wherein the controller switches the first switch and the second switch so as to supply the power to the first power transmission coil and the second power transmission coil on the hoistway side where the car passing through or stopping at the power supply floor moves when one of the first car and the second car passes through or stops at the power supply floor.

12. The wireless power supply system according to claim 10, wherein a plurality of the first power transmission coils and a plurality of the second power transmission coils are provided in one the power supply floor, and the controller switches each of the first switch and the second switch such that a ratio of supplying the power to the first power transmission coil and the second power transmission coil on the first hoistway side and a ratio of supplying the power to the first power transmission coil and the second power transmission coil on the second hoistway side become identical when the first car and the second car pass through or stop at the identical power supply floor.

* * * * *